United States Patent
Helms et al.

(10) Patent No.: US 10,808,472 B2
(45) Date of Patent: Oct. 20, 2020

(54) METHOD AND SYSTEM FOR EVALUATING TUBULAR MAKEUP

(71) Applicant: Weatherford Technology Holdings, LLC, Houston, TX (US)

(72) Inventors: Martin Helms, Burgdorf (DE); Bjoern Thiemann, Burgwedel (DE); Michael Wiedecke, Salzhemmendorf (DE); Rainer Ruehmann, Hannover (DE); David Geissler, Hannover (DE); Benjamin Sachtleben, Hannover (DE)

(73) Assignee: Weatherford Technology Holdings, LLC, Houston, TX (US)

( * ) Notice: Subject to any disclaimer, the term of this patent is extended or adjusted under 35 U.S.C. 154(b) by 72 days.

(21) Appl. No.: 16/169,682

(22) Filed: Oct. 24, 2018

(65) Prior Publication Data
US 2019/0119997 A1 Apr. 25, 2019

Related U.S. Application Data

(63) Continuation-in-part of application No. 15/792,592, filed on Oct. 24, 2017.

(51) Int. Cl.
| | |
|---|---|
| *E21B 19/16* | (2006.01) |
| *E21B 19/24* | (2006.01) |
| *E21B 21/02* | (2006.01) |
| *B23P 19/06* | (2006.01) |
| *G01L 5/24* | (2006.01) |

(52) U.S. Cl.
CPC ......... *E21B 19/165* (2013.01); *B23P 19/061* (2013.01); *E21B 19/164* (2013.01); *E21B 19/166* (2013.01); *E21B 19/24* (2013.01); *E21B 21/02* (2013.01); *G01L 5/24* (2013.01)

(58) Field of Classification Search
CPC ...................................................... E21B 19/16
USPC ...................................................... 166/77.51
See application file for complete search history.

(56) References Cited

U.S. PATENT DOCUMENTS

| | | | |
|---|---|---|---|
| 4,365,402 A | 12/1982 | McCombs et al. | |
| 7,757,759 B2 | 7/2010 | Jahn et al. | |
| 8,042,432 B2 | 10/2011 | Hunter et al. | |
| 2004/0144547 A1 | 7/2004 | Koithan et al. | |
| 2005/0092143 A1 | 5/2005 | Lehnert et al. | |
| 2009/0126536 A1 | 5/2009 | Begnaud et al. | |

FOREIGN PATENT DOCUMENTS

| | | |
|---|---|---|
| GB | 2033089 A | 5/1980 |
| WO | 2008028302 A1 | 3/2008 |

OTHER PUBLICATIONS

PCT International Search Report and Written Opinion dated Apr. 2, 2019, for International Application No. PCT/US2018/057381.

*Primary Examiner* — Taras P Bemko
(74) *Attorney, Agent, or Firm* — Patterson + Sheridan, LLP

(57) ABSTRACT

Methods and systems for connecting threaded tubulars are presented. One example method generally includes monitoring relative rotation between a backup tong and a tubular clamped in the backup tong to determine slippage of the backup tong.

20 Claims, 15 Drawing Sheets

METHOD AND SYSTEM FOR EVALUATING TUBULAR MAKEUP

BACKGROUND

Field of the Invention

The present disclosure generally relates to method and systems for evaluating a tubular makeup.

Description of the Related Art

Construction of oil or gas wells usually requires making long tubular strings that make up casing, risers, drill pipe, or other tubing. Due to the length of these strings, sections or joints of tubulars are progressively added to or removed from the tubular strings as they are lowered or raised from a drilling platform. Tongs are devices used on oil and gas rigs for gripping and/or rotating tubular members, such as casing, drill pipe, drill collars, and coiled tubing (herein referred to collectively as tubulars and/or tubular strings). Tongs may be used to make-up or break-out threaded joints between tubulars. Tongs typically resemble large wrenches, and may sometimes be referred to as power tongs, torque wrenches, spinning wrenches, and/or iron roughnecks. Tongs typically use hydraulic power to provide sufficiently high torque to make-up or break-out threaded joints between tubulars.

A drilling rig is constructed on the earth's surface or floated on water to facilitate the insertion and removal of tubular strings (e.g., drill pipe, casing, sucker rod, riser, or production tubing) into a wellbore. The drilling rig includes a platform and power tools, such as an elevator and slips, to engage, assemble, and lower the tubulars into the wellbore. The elevator is suspended above the platform by a draw works that can raise or lower the elevator in relation to the floor of the rig. The slips are mounted in the platform floor. The elevator and slips are each capable of engaging and releasing a tubular and are designed to work in tandem. Generally, the slips hold a tubular or tubular string that extends into the wellbore from the platform. The tubular or tubular string includes a tubular coupling configured to receive the next tubular to be madeup with the tubular string. The elevator engages a tubular joint and aligns it over the tubular string being held by the slips. One or more makeup tools, e.g. a power tong and a spinner, are then used to thread the joint and the string together at the tubular coupling. Once the tubulars are joined, the slips disengage the tubular string and the elevator lowers the tubular string through the slips until the elevator and slips are at a predetermined distance from each other. The slips then reengage the tubular string and the elevator disengages the string and repeats the process. This sequence applies to assembling tubulars for the purpose of drilling, deploying casing, or deploying other components into the wellbore. The sequence is reversed to disassemble the tubular string.

The one or more makeup tools engage the tubulars and rotate the tubulars relative to each other. The one or more makeup tools use clamps to engage the tubulars. During makeup, the one or more makeup tools can lose clamping force. Loss of clamping force can result in rotation of the clamp relative to the associated engaged tubular, also known as slippage. For example, slippage can occur between a power tong of the one or more makeup tools and the tubular being added to the tubular string. Loss of clamping force can also result in rotation and slippage of the tubular string relative to a backup tong of the one or more makeup tools configured to engage and hold the tubular string. Slippage can also occur at the tubular coupling due to insufficient mill side makeup of the tubular coupling and the last tubular joint added to the tubular string. Current systems measure only the turns of the clamp during the makeup operation which does not account for all forms of slippage. Therefore, there is a need for new and improved methods for evaluating tubular makeup.

SUMMARY

The present disclosure generally relates to methods and system for evaluating a tubular makeup.

According to one embodiment, a tubular makeup system is provided. The tubular makeup system generally includes a makeup tool operable to rotate a first threaded tubular relative to a second threaded tubular. The makeup tool generally includes a clamp configured to: engage the first tubular; and rotate relative to the second tubular. The system also includes a first turns counter configured to measure turns of the first tubular and a second turns counter configured to measure turns of the clamp. The system also includes a programmable logic controller (PLC) operably connected to the makeup tool and communicatively coupled to the first turns counter and the second turns counter. The PLC is configured to control an operation, generally including: engaging threads of the tubulars; engaging the first tubular with the clamp; rotating the clamp, thereby rotating the first tubular relative to the second tubular and making up a threaded connection; during makeup of the threaded connection, measuring turns of the first tubular and measuring turns of the clamp; and evaluating the threaded connection by comparing the measured turns of the first tubular and the measured turns of the clamp.

According to another embodiment, a tubular makeup system is provided. The tubular makeup system generally includes a makeup tool operable to rotate a first tubular relative to a second tubular. The makeup tool generally includes a clamp configured to engage the first tubular. The tubular makeup system also generally includes a first turns counter configured to measure turns of the first tubular and a second turns counter configured to measure turns of the clamp.

According to yet another embodiment, a method of connecting a first threaded tubular to a second threaded tubular is provided. The method generally includes engaging threads of the tubulars; engaging the first tubular with a clamp of a makeup tool; rotating the clamp of the makeup tool, thereby rotating the first tubular relative to the second tubular and making up the threaded connection; measuring turns of the first tubular; measuring turns of the clamp; and evaluating the threaded connection by comparing the measured turns of the first tubular and the measured turns of the clamp.

One or more embodiments of the present disclosure provide a tong assembly comprising a power tong, a backup tong and a rotation detection assembly attached to the backup tong. The rotation detection assembly comprises a guide movably attached to the backup tong, and a turns sensor disposed on the guide, wherein the guide is movable relative to the backup tong to move the turns sensor between an operating position and a non-operating position.

One or more embodiments of the present disclosure provide a method for operating a tong assembly. The method comprises clamping a first tubular using a backup tong in the tong assembly, wherein a coupling is pre-made on the first tubular, clamping a second tubular using a power tong in the tong assembly, and rotating the power tong to makeup or break out a connection between the coupling and the second tubular while monitoring a relative rotation between the coupling and the backup tong.

One or more embodiments of the present disclosure provide a tong assembly comprising a backup tong configured to clamp a first tubular in a stationary position, a turns sensor attached to the backup tong to measure a relative rotation between the backup tong and the first tubular, a power tong configured to clamp and rotate a second tubular relative to makeup or break out a connection between the first and second tubulars, and a controller connected to the power tong and the turns sensor, wherein the controller includes instructions, when executed by a computer, performing operations comprising monitoring the turns sensor to detect slippage of the backup tong, and stopping the power tong upon detection of slippage of the backup tong.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Aspects of the present disclosure generally relate to evaluation of tubular makeup. For example, tubular makeup can include use of power tongs. However, the aspects of this disclosure for evaluation of tubular makeup are not limited to this system, but could be used for evaluation of tubular makeup in any system. The power tongs (or other system) may include turns counters to measure turns of the threaded tubulars, tubular couplings, and clamps of the power tongs during the tubular makeup (or other connections, such as casing, etc., during a makeup process). The turns counters may be in communication with a remote processing system, which may be on-site, in a nearby operator room, or off-site.

The remote processing system may be used to analyze the measurements, such as turns measurements by the turns counters during a tubular makeup. The remote processing system may perform such functions as providing outputting information to a display, such as graphical representations of turns, alerts or status message to an operator related to quality of the connections in the system, or even automated control of the system based on the measurements. In some cases, the remote processing system uses other processing systems, clients, or programs to perform some of the functions described above. In some cases, the remote processing system is operated by, or takes some input from, an operator or technician. FIGS. 1A-3B below illustrate one example of a tubular makeup system in communication with a processing system with a graphical evaluator, in which aspects of the present disclosure may be applied.

Techniques and apparatus are provided herein for evaluation of tubular makeup, which may reduce errors in threaded connections.

Example Graphical Evaluator for Tubular Makeup

Figure 1A:
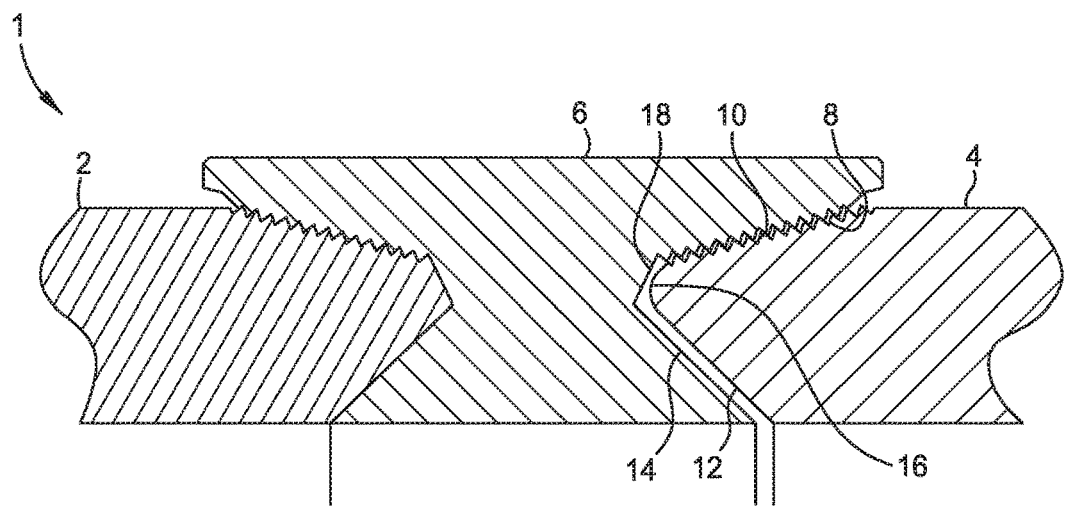
FIG. 1A is a partial cross-sectional view of a connection between threaded premium grade tubulars.

FIG. 1A illustrates a connection 1 between premium grade tubulars 2, 4. The tubulars 2, 4 may be any oil country tubular good, such as production tubing, casing, liner, or drill pipe. The connection 1 may include a first tubular 2 joined to a second tubular 4 through a tubular coupling 6. Each of the tubulars 2, 4 and the coupling 6 may be made from a metal or alloy, such as plain carbon steel, low alloy steel, high strength low alloy steel, stainless steel, or a nickel based alloy. The end of each tubular 2, 4 may have a tapered externally-threaded surface 8 (aka a pin) which co-operates with a correspondingly tapered internally-threaded surface (aka box) 10 on the coupling 6. Each tubular 2, 4 may be provided with a torque shoulder 12 which co-operates with a corresponding torque shoulder 14 on the coupling 6. At a terminal end of each tubular 2, 4, there may be defined an annular sealing area 16 which is engageable with a co-operating annular sealing area 18 defined between the tapered portions 10, 14 of the coupling 6. Alternatively, the sealing areas 16, 18 may be located at other positions in the connection 1 than adjacent the shoulders 12, 14.

Figure 1B:
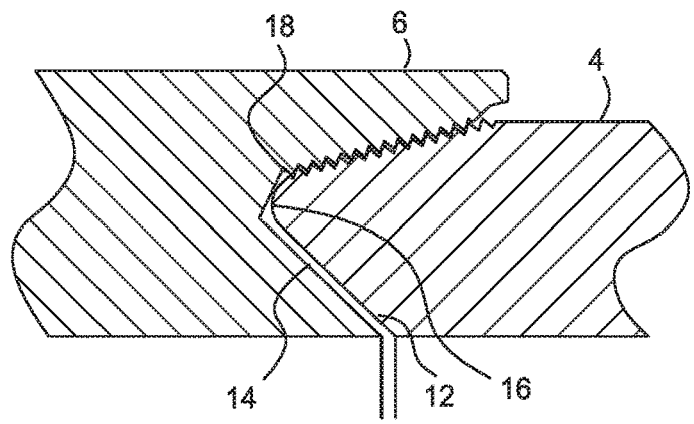
FIG. 1B is a partial cross-sectional view of a connection between threaded premium grade tubulars in a seal position formed by engagement between sealing surfaces.
Figure 1C:
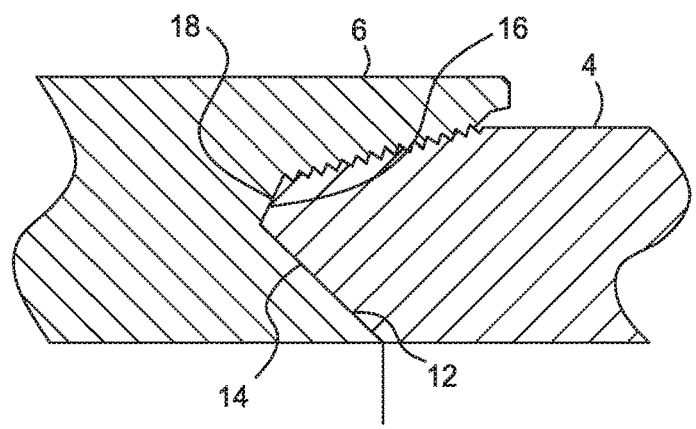
FIG. 1C is a partial cross-sectional view of a connection between threaded premium grade tubulars in a shoulder position formed by engagement between shoulder surfaces.

During makeup, the box 10 is engaged with the pin 8 and then screwed onto the pin by relative rotation therewith. During continued rotation, the annular sealing areas 16, 18 contact one another, as shown in FIG. 1B. This initial contact is referred to as the "seal position". As the tubular 2 is further rotated, the co-operating tapered torque shoulders 12, 14 contact and bear against one another at a machine detectable stage referred to as a "shoulder position", as shown in FIG. 1C. The increasing pressure interface between the tapered torque shoulders 12, 14 cause the seals 16, 18 to be forced into a tighter metal-to-metal sealing engagement with each other causing deformation of the seals 16 and eventually forming a fluid-tight seal.

Figure 2A:
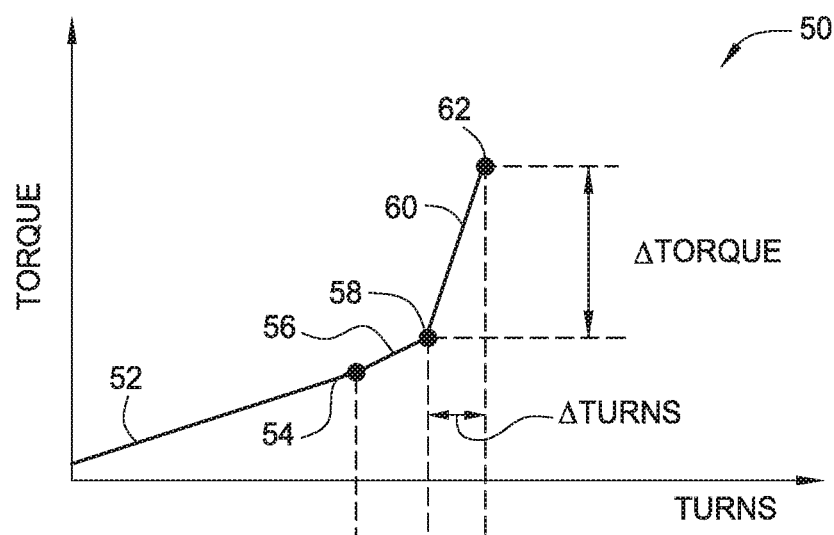
FIG. 2A illustrates an ideal torque-turns curve for the premium connection
Figure 2B:
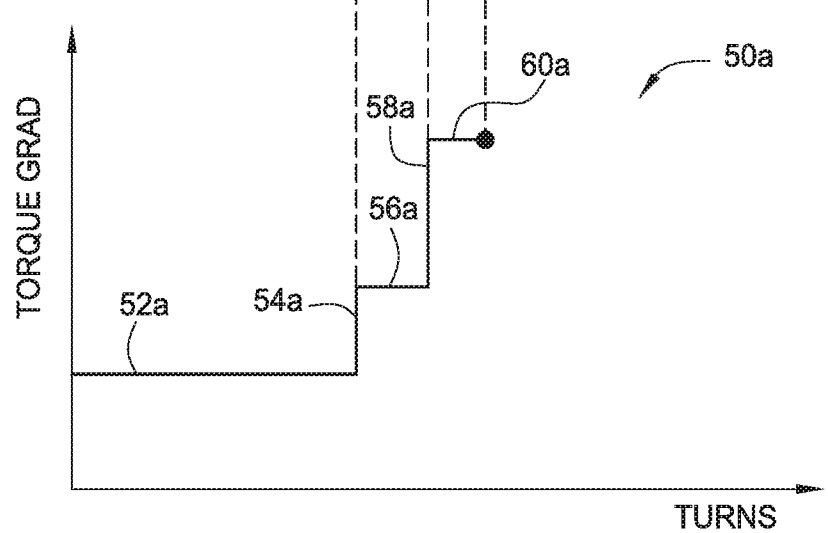
FIG. 2B illustrates an ideal torque gradient-turns curve for the premium connection.

FIG. 2A illustrates an ideal torque-turns curve 50 for the premium connection. FIG. 2B illustrates an ideal torque gradient-turns curve 50*a* for the premium connection. During makeup of the tubulars 2, 4, torque and turns measurements may be recorded and the curves 50, 50*a* displayed for evaluation by a technician. Shortly after the coupling 6 engages the tubular 2 and torque is applied, the measured torque increases linearly as illustrated by curve portion 52. As a result, corresponding curve portion 52*a* of the differential curve 50*a* is flat at some positive value.

During continued rotation, the annular sealing areas 16, 18 contact one another causing a slight change (specifically, an increase) in the torque rate, as illustrated by point 54. Thus, point 54 corresponds to the seal position shown in FIG. 1B and is plotted as the first step 54*a* of the differential curve 50*a*. The torque rate then again stabilizes resulting in the linear curve portion 56 and the plateau 56*a*. In practice, the seal condition (point 54) may be too slight to be detectable. However, in a properly behaved makeup, a discernable/detectable change in the torque rate occurs when the shoulder position is achieved (corresponding to FIG. 1C), as represented by point 58 and step 58*a*. The torque rate then again increases linearly as illustrated by curve portion 60 and the plateau 60*a* until makeup of the connection is terminated at final torque 62.

Figure 3A:
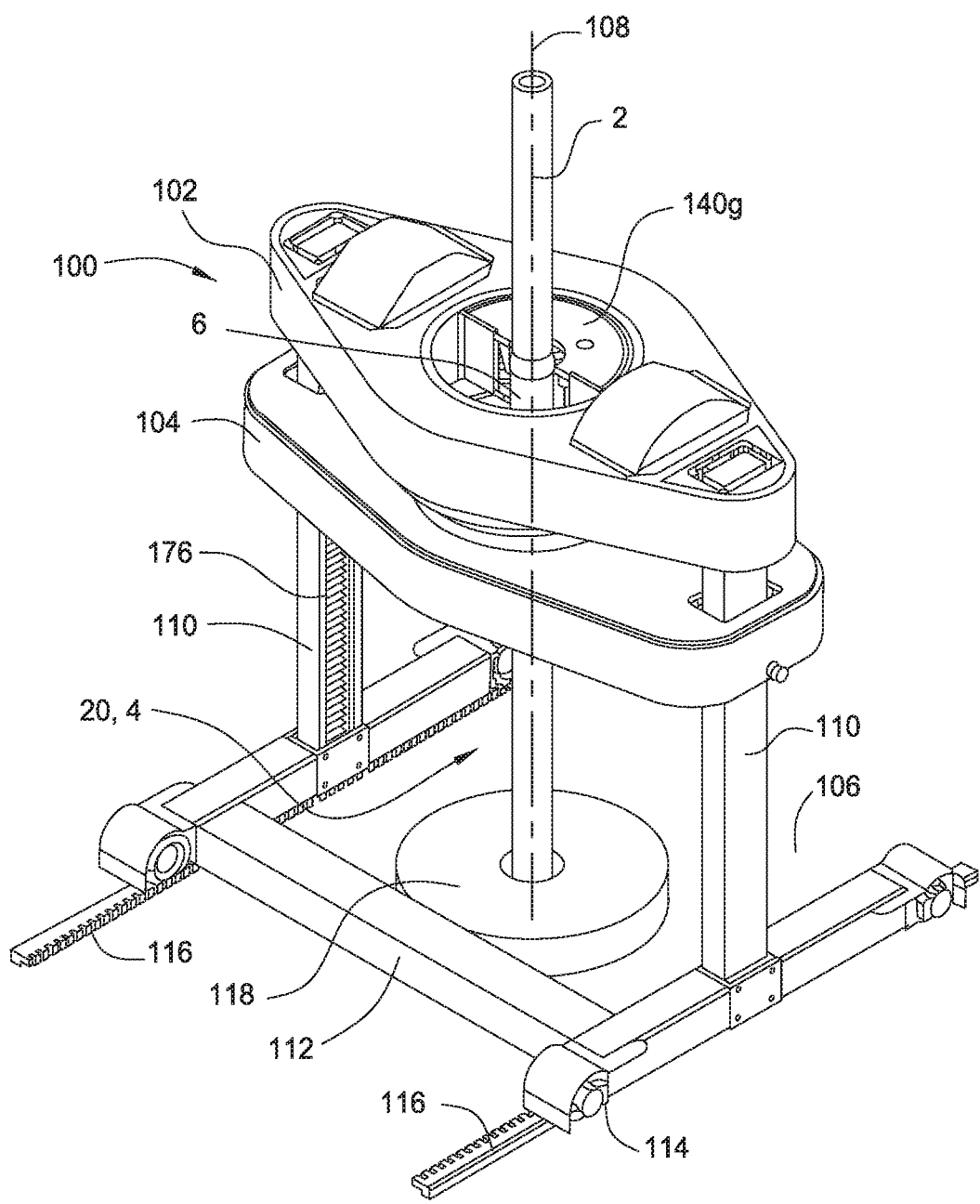
FIG. 3A is a perspective view of a tong assembly in an upper position.

FIG. 3A is a perspective view of a makeup tool, such as tong assembly 100, in an upper position. A group 140*g* of clamps has been removed for illustrative purposes. The tong assembly 100 may include a power tong 102 and a back-up tong 104 located on a drilling rig 106 coaxially with a drilling center 108 of the drilling rig 106. The assembly 100 may be coupled in a vertically displaceable manner to one or more guide columns 110 (two shown) arranged diametrically opposite each other relative to the drilling center 108. The guide columns 110 may be connected to a chassis 112 which by wheels 114 and hydraulic motors (not shown) may be displaced horizontally on rails 116 connected to the drilling rig 106. In the operative position, the assembly 100 may be located immediately above the slips 118 of the drilling rig 106.

The power tong 102 may include a power tong housing provided with a through aperture that corresponds to the guide columns 110, and an undivided drive ring connected via a bearing ring (not shown). The bearing ring may have a toothed ring (not shown) in mesh with cogwheels (not shown) on one or more hydraulic motors (not shown), such as two. One of the motors may be a spinner motor (high speed, low torque) and the other motor may be one or more torque motors (high torque, low speed). The toothed ring may be coupled to the drive ring by screw-bolt-joints (not shown). The hydraulic motors may be arranged to rotate the drive ring about the drilling center 108. The two hydraulic motors may be disposed on diametrically opposite sides of the drive ring. A cover may be provided to cover the power tong housing.

In the drive ring and co-rotating with this may be two crescent-shaped groups 140*g* (only one shown) of clamps. A turns counter may be configured to measure the rotation of the clamps. Each group 140*g* of clamps may be provided with one or more, such as three, clamps distributed around the drilling center 108. Each clamp may include a cylinder block provided with one or more, such as three, cylinder bores arranged in a vertical row. In each cylinder bore may be a corresponding longitudinally displaceable piston that seals against the cylinder bore by a piston gasket. A rear gasket may prevent pressurized fluid from flowing out between the piston and the cylinder bore at the rear end of the piston.

The pistons may be fastened to the housing of the group 140*g* of clamps by respective screw-bolt-joints. On the part of the cylinder block facing the drilling center 108 there may be provided a gripper. The gripper may be connected to the cylinder block by fastening, such as with dovetail grooves or screw-bolt-joints (not shown). Surrounding the drive ring there may be provided a swivel ring that seals by swivel gaskets, the swivel ring may be stationary relative to the power tong housing. The swivel ring may have a first passage that communicates with the plus side of the pistons via a first fluid connection, a second passage that communicates with the minus side of the pistons via a second fluid connection, and a further passage. The cylinder and the piston may thereby be double acting. The swivel ring, swivel gaskets and drive ring may together form a swivel coupling.

The backup tong 104 may also include the clamp groups. The back-up tong 104 may further include a back-up tong housing with guides 176 that correspond with the guide columns 110, and a retainer ring for two groups of clamps. At the guides 176 there may be cogwheels that mesh with respective pitch racks of the guide columns 110. Separate hydraulic motors may drive the cogwheels via gears. A pair of hydraulic cylinders may be arranged to adjust the vertical distance between the power tong 102 and the back-up tong 104.

In operation, when the tubular joint 2 is to be added to tubular string 20 (already including tubular joint 4), the assembly 100 may be displaced vertically along the guide columns 110 by the hydraulic motors, the gears, the cogwheels and the pitch racks until the back-up tong 104 corresponds with the pin 8 of the tubular string 20. The box 10 of the coupling 6 may have been madeup to the pin 8 of the joint 4 offsite (aka bucking operation) before the tubulars 2, 4 are transported to the rig. Alternatively the coupling 6 may be bucked on the joint 2 instead of the joint 4. Alternatively, the coupling 6 may be welded to one of the tubulars 2, 4 instead of being bucked on.

The vertical distance between the back-up tong 104 and the power tong 102 may be adjusted so as to make the grippers correspond with the tubular 2. The clamps may be moved up to the tubular 2 by pressurized fluid flowing to the first passage in the swivel ring and on through the first fluid connection to the plus side of the pistons. The excess fluid on the minus side of the pistons may flow via the second fluid connection and the second passage back to a hydraulic power unit (not shown).

The grippers may then grip their respective pin or box while the hydraulic motors rotate the drive ring and the groups 140*g* of clamps about the drilling center 108, while at the same time constant pressure may be applied through the swivel ring to the plus side of the pistons. The power tong 102 may be displaced down towards the back-up tong 104 while the screwing takes place. After the desired torque has been achieved, the rotation of the drive ring may be stopped. The clamps may be retracted from the tubular string 20 by pressurized fluid being delivered to the minus side of the pistons via the swivel ring. The assembly 100 may be released from the tubular string 20 and moved to its lower position.

When a joint 2 is to be removed from the tubular string 20, the operation is performed in a similar manner to that described above. When tools or other objects of a larger outer diameter than the tubular string 20 are to be displaced through the assembly 100, the grippers may easily be removed from their respective clamps, or alternatively the groups 140g of clamps can be lifted out of the drive ring.

Alternatively, other types of tong assemblies may be used instead of the tong assembly 100.

Figure 3B:
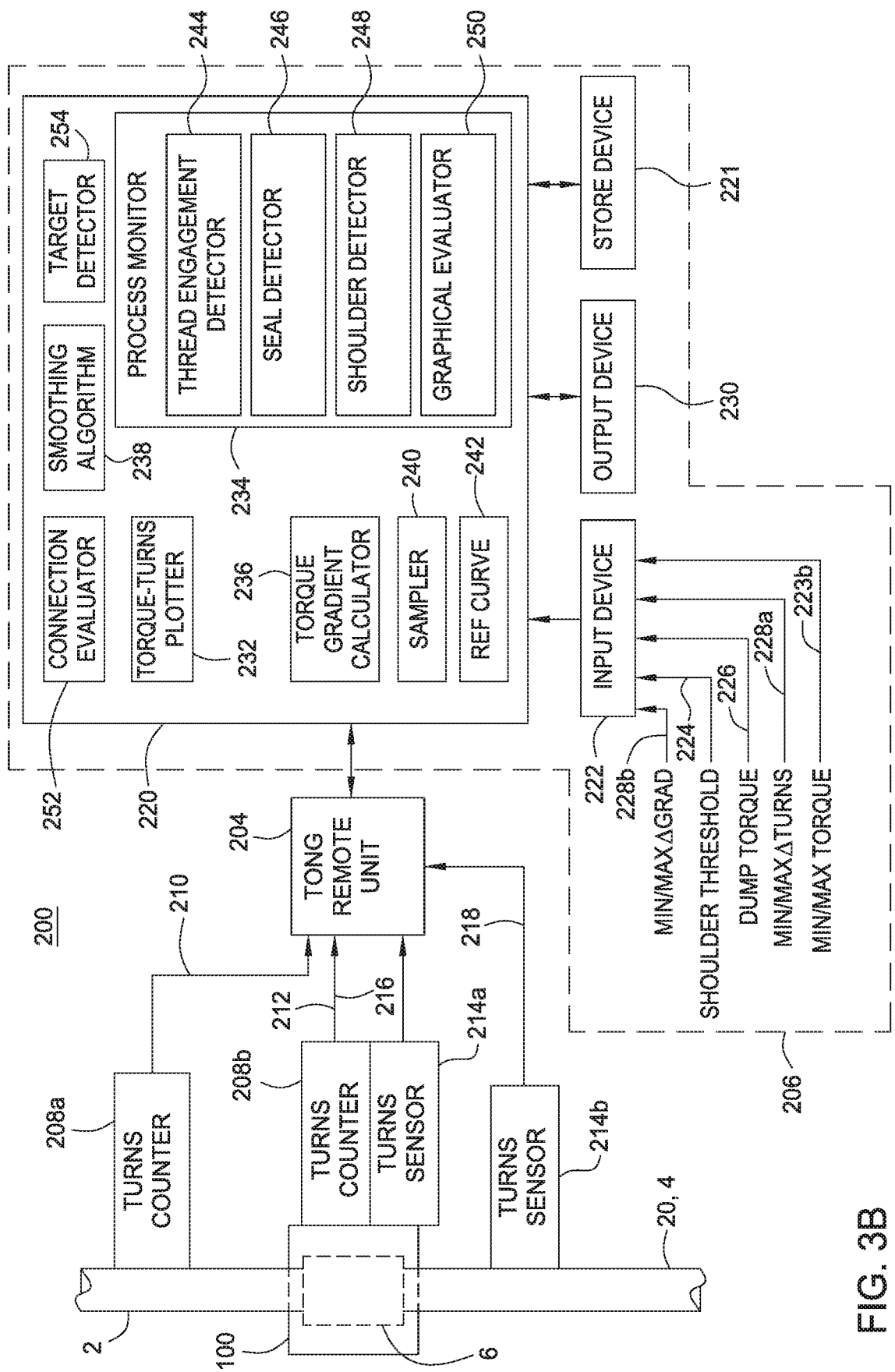
FIG. 3B is a block diagram illustrating a tubular makeup system.

FIG. 3B is a block diagram illustrating a tubular makeup system 200, according to one embodiment of the present invention. The tubular makeup system 200 may include the tong assembly 100, a tong remote unit (TRU) 204, a first turns counter 208a, a second turns counter 208b, a first turns sensor 214a, a second turns sensor 214b, a torque cell, and a control system 206.

The turns counters 208a,b may be mounted to the tong assembly 100 and communicatively coupled to the tong remote unit 204. The turns counters 208a,b may be any sensor capable of measuring rotation. The turns counters 208a,b may be contactless turns counters. For example, the turns counters 208a,b may be an optical camera based sensor or a laser based sensor. Alternatively, the turns counters 208a,b may be configured to contact a surface to be measured for rotation. For example, the turns counters 208a,b may be a friction wheel sensor. The first turns counter 208a may be configured to measure turns of the tubular 2. The first turns counter 208a may be configured to measure the rotation at any point along the tubular 2. For example, the first turns counter 208a may be configured to measure rotation at a point along tubular 2 above where the clamps of the tong assembly 100 engage the tubular 2. The first turns counter 208a may be configured to output a turns count signal 210. The second turns counter 208b may be configured to measure turns of the clamp 140g of the tong assembly 100. The second turns counter 208b may be configured to measure the rotation at any point along the clamp 140g. The second turns counter 208b may be configured to output a turns count signal 212.

The turns sensors 214a,b may be mounted to the tong assembly 100 and communicatively coupled to the tong remote unit 204. The turns sensors 214a,b may be any sensor capable of detecting rotation. The turns sensors 214a,b may be contactless turns detectors. For example, the turns sensors 214a,b may be an optical camera based sensor or a laser based sensor. Alternatively, the turns sensors 214a,b may be configured to contact a surface to detect rotation at the surface. For example, the turns sensors 214a,b may be a friction wheel detector. The first turns sensor 214a may be configured to detect rotation of the tubular coupling 6. The first turns sensor 214a may be configured to detect rotation of the tubular coupling 6 relative to the tubular 4. The first turns sensor 214a may be configured to detect rotation at any point along the tubular coupling 6. The first turns sensor 214a may be configured to output a turns detection signal 216. The second turns sensor 214b may be configured to detect rotation of the second tubular 4. The second turns sensor 214b may be configured to detect rotation of the second tubular 4 relative to the backup tong 104. The second turns sensor 214b may be configured to detect rotation at any point along the second tubular 4. The second turns sensor 214b may be configured to output a turns detection signal 218. The control system may communicate with the TRU 204 via an interface. Depending on sophistication of the TRU 204, the interface may be analog or digital. Alternatively, the control system 206 may also serve as the TRU.

A programmable logic controller (PLC) 220 of the control system 206 may monitor the turns count signals 210, 212 and turn detection signals 216, 218 from the respective sensors 208a,b, 214a,b along with torque values from the torque cell and compare the measured values of these signals with predetermined values 223-228b. In aspects, the PLC 220 may be any type of embedded computer device, for example, the PLC 220 may be replaced by a microcontroller unit (MCU), field programmable gate array (FPGA), application specific integrated circuit (ASIC), application specific instruction set processor (ASIP), digital signal processor (DSP), etc. The predetermined values 223-228b may be input by a technician for a particular connection. The predetermined values 223-228b may be input to the PLC 220 via an input device 222, such as a keypad or any touch sensitive display. In some embodiment, the control system 206 includes a storage device 221 communicating with the PLC 220.

Illustrative predetermined values 223-228b which may be input, by an technician or otherwise, include minimum and maximum delta gradient values 223, a shoulder threshold gradient 224, a dump torque value 226, minimum and maximum delta turns values 228a, minimum and maximum torque values 228b, and reference curve data 242. The minimum and maximum torque values 228b may include a set for the shoulder position and a set for the final position. The torque values 228b may be derived theoretically, such as by finite element analysis, or empirically, such as by laboratory testing and/or analysis of historical data for a particular connection. The dump torque value 226 may simply be an average of the final minimum and maximum torque values 228b. During makeup of the connection 1, various outputs may be observed by a technician on output device, such as a video monitor, which may be one of a plurality of output devices 230. A technician may observe the various predefined values which have been input for a particular connection. Further, the technician may observe graphical information such as the torque rate curve 50 and the torque rate differential curve 50a. The plurality of output devices 230 may also include a printer such as a strip chart recorder or a digital printer, or a plotter, such as an x-y plotter, to provide a hard copy output. The plurality of output devices 230 may further include an alarm, such as a horn or other audio equipment, to alert the technician of significant events occurring during makeup, such as the shoulder position, termination, and/or a violation of a criterion.

Upon the occurrence of a predefined event(s), the PLC 220 may output a dump signal to the TRU 204 to automatically shut down or reduce the torque exerted by the tong assembly 100. For example, dump signal may be issued in response to the measured torque value reaching the dump torque 226 and/or a bad connection.

The comparison of measured turn count values and torque values with respect to predetermined values is performed by one or more functional units of the PLC 220. The functional units may generally be implemented as hardware, software or a combination thereof. The functional units may include one or more of a torque-turns plotter algorithm 232, a process monitor 234, a torque gradient calculator 236, a smoothing algorithm 238, a sampler 240, a database 242 of reference curves, a connection evaluator 252, and a target detector 254. The process monitor 234 may include one or more of a thread engagement detection algorithm 244, a seal detection algorithm 246, a shoulder detection algorithm 248, and a graphical evaluator algorithm 250. Alternatively, the functional units may be performed by a single unit. As such, the functional units may be considered logical representations, rather than well-defined and individually distinguishable components of software or hardware.

In operation, one of the threaded members (e.g., tubular 2) is rotated by the power tong 102 while the other threaded member (e.g., tubular 4 and coupling 6) is held by the backup tong 104. The applied torque and rotation are measured at regular intervals throughout the makeup. The frequency with which torque and rotation are measured may be specified by the sampler 240. The sampler 240 may be configurable, so that a technician may input a desired sampling frequency. The torque and rotation values may be stored as a paired set in a buffer area of memory. Further, the rate of change of torque with respect to rotation (hereinafter "torque gradient") may be calculated for each paired set of measurements by the torque gradient calculator 236. The smoothing algorithm 238 may operate to smooth the torque-turns curve 50 and/or torque gradient curve 50a (e.g., by way of a running average). These values (torque, rotation, and torque gradient) may then be plotted by the plotter 232 for display on the output device 230.

The values (torque, rotation, and torque gradient) may then be compared by the connection evaluator 252, either continuously or at selected events, with predetermined values, such as the values 223-228b. Based on the comparison of the measured and/or calculated values with the predefined values 223-228b, the process monitor 234 may determine the occurrence of various events and the connection evaluator 252 may determine whether to continue rotation or abort the makeup. The thread engagement detection algorithm 244 may monitor for thread engagement of the pin 8 and box 10. Upon detection of thread engagement a first marker is stored. The marker may be quantified, for example, by time, rotation, torque, the torque gradient, or a combination of any such quantifications. During continued rotation, the seal detection algorithm 246 monitors for the seal condition. This may be accomplished by comparing the calculated torque gradient with a predetermined threshold seal condition value. A second marker indicating the seal condition may be stored if/when the seal condition is detected. At this point, the torque value at the seal condition may be evaluated by the connection evaluator 252.

For example, a determination may be made as to whether the turns value and/or torque value are within specified limits. The specified limits may be predetermined, or based off of a value measured during makeup. If the connection evaluator 252 determines a bad connection, rotation may be terminated. Otherwise, rotation continues and the shoulder detection algorithm 248 monitors for the shoulder position. This may be accomplished by comparing the calculated torque gradient with the shoulder threshold gradient 224. When the shoulder position is detected, a third marker indicating the shoulder position is stored. The connection evaluator 252 may then determine whether the torque value at the shoulder position is acceptable by comparing to the respective input torque values 228b.

Upon continuing rotation, the target detector 254 compares the measured torque to the dump torque value 226. Once the dump torque value 226 is reached, rotation may be terminated by sending the dump signal. Alternatively, the dump signal may be issued slightly before the dump torque 226 is reached to account for system inertia. Once the connection is complete, the connection evaluator 252 may calculate a delta turns value based on the difference between the final turns value and the turns value at the shoulder condition. The connection evaluator 252 may compare the delta turns value with the input delta turns values 228a. Similarly, the connection evaluator may compare the final torque value to the respective input torque values 228b. The connection evaluator 252 may calculate a delta torque value based on the difference between the final torque value and the torque value at the shoulder condition. The connection evaluator 252 may calculate a delta gradient value using delta torque and delta turns values and compare it with the respective input values 223. If either criterion is not met, then the connection evaluator 252 may indicate a bad connection.

Alternatively, a delta turns value may be entered instead of the dump torque 226. The target detector 254 may then calculate a target turns value using the shoulder turns and the delta turns value (target turns equals shoulder turns plus delta turns).

As mentioned above, the example tubular makeup system 200 includes predetermined values 223-228b input by a technician or operator. Wrong inputs of the measured values may lead to incorrect calculated torque values which, in turn, may lead to under torque or over torque, and may be without any warning. In order to reduce the possibility of human error and to increase efficiency, it is desirable to automate the process of monitoring threaded connections, evaluating the quality of threaded connections, and controlling the assembly system.

The PLC 220 of the control system 206 may compare the turns count signals 210, 212. The comparison between turns count signal 210 and turns count signal 212 is performed by one or more functional units of the PLC 220. The functional units may include one or more of the torque-turns plotter algorithm 232, the process monitor 234, the torque gradient calculator 236, the smoothing algorithm 238, the sampler 240, the database 242 of reference curves, the connection evaluator 252, and the target detector 254. Alternatively, the functional units may be performed by a single unit. As such, the functional units may be considered logical representations, rather than well-defined and individually distinguishable components of software or hardware.

In operation, one of the threaded members (e.g., tubular 2) is rotated by the power tong 102 while the other threaded member (e.g., tubular 4 and coupling 6) is held by the backup tong 104. The rotation of the tubular 2 and clamp 140g are measured and rotation of the tubular 4 and coupling 6 are detected at regular intervals throughout the makeup. The frequency with which the rotation is measured and detected may be specified by the sampler 240. The sampler 240 may be configurable so that a technician may input a desired sampling frequency. The measured rotation values of the tubular 2 and clamp 140g may be stored as a paired set in a buffer area of memory.

The measured turns values of the tubular 2 and clamp 140g may then be compared by the connection evaluator 252, either continuously or at selected events. Based on the comparison between the measured turns values of the tubular 2 and clamp 140g, the process monitor 234 may determine the occurrence of various events and the connection evaluator 252 may determine whether to continue rotation or abort the makeup. For example, the process monitor 234 may determine if a first type of slippage event occurred based on the comparison between the measured turns values of the tubular 2 and clamp 140g. The process monitor 234 may compare the measured turns values of the tubular 2 and clamp 140*g*. Any difference between the measured turns values may indicate a slippage event occurred between the tubular 2 and the clamp 140*g* during the makeup operation.

A second type of slippage event may be evaluated based on the detected turns signals 216, 218. The detected turns signals of the coupling 6 and the tubular 4 may be evaluated by the connection evaluator 252, either continuously or at selected events. Based on the turns detection of the coupling 6 and the tubular 4, the process monitor 234 may determine the occurrence of various events and the connection evaluator 252 may determine whether to continue rotation or abort the makeup. For example, process monitor 234 may determine if a slippage event occurred between the tubular 4 and the coupling 6 based on a comparison between the detected turns signals of the coupling 6 and the tubular 4. The process monitor 234 may compare the detected turns signals to determine whether either of the coupling 6 and/or the tubular 4 rotated during the makeup operation. Detected turns of one of the coupling 6 or the tubular 4 may indicate a slippage event occurred during the makeup operation. A slippage event between the coupling 6 and the tubular 4 may be due to insufficient mill side makeup between the coupling 6 and the tubular 4.

A third type of slippage event may be evaluated based on the detected turns signal 218. The detected turns signal of the tubular 4 may be evaluated by the connection evaluator 252, either continuously or at selected events. Based on the turns detection of the tubular 4, the process monitor 234 may determine the occurrence of various events and the connection evaluator 252 may determine whether to continue rotation or abort the makeup. For example, process monitor 234 may determine if a slippage event occurred between the tubular 4 and the backup tong 104 based on a detection of turns at the tubular 4 by the second turns sensor 214*b*. Detected turns of the tubular 4 may indicate a slippage event occurred between the tubular 4 and the backup tong 104 during the makeup operation.

If any slippage event occurs, the connection evaluator 252 may evaluate the connection. The connection evaluator 252 may evaluate the slippage event(s) based on the measured turns values, the difference between the measured turns values, the number of slippage events, the type of each slippage event, and when the slippage event(s) happened. For example, the connection evaluator 252 may compare final measured turns values of the clamp 140*g* and the tubular 2. The connection evaluator 252 may determine whether slippage(s) occurred before or after the shoulder condition. If the connection evaluator 252 determines a bad connection, rotation may be terminated.

Although a tong system is described with respect to FIGS. 1A-3B, other systems can be used for tubular makeups, such as a top drive system. These systems can also include graphical evaluators for monitoring the connections.

Example Tubular Makeup System

Figure 4:
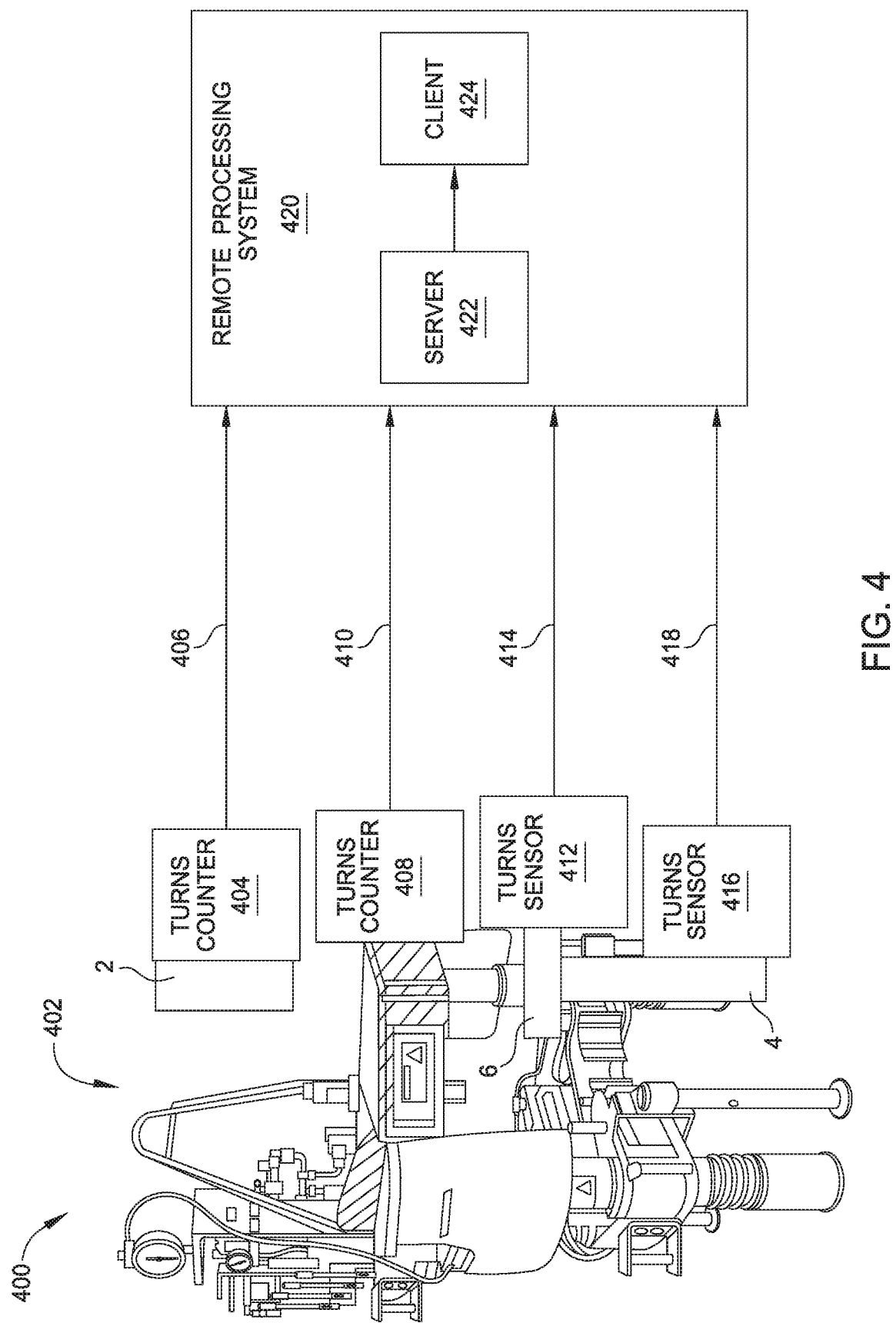
FIG. 4 illustrates an example tubular makeup system including a first turns counter and a second turns counter, in accordance with certain aspects of the present disclosure.

FIG. 4 illustrates an example tubular makeup system 400 including a first turns counter 404 and a second turns counter 408, in accordance with certain aspects of the present disclosure. The tubular makeup system 400 may include a power drive 402, a first turns counter 404, a second turns counter 408, a first turns sensor 412, a second turns sensor 416, and a remote processing system 420 (e.g., similar to tong remote unit 204 or control system 206) that includes a server 422 and a client 424. Alternatively, a turns counter can be used in place of the first turns sensor 412. A turns counter can be used in place of the second turns sensor 416.

The power drive 402 may be a tong assembly (e.g., similar to tong assembly 100), over drive system, or other makeup tool for connecting casing, tubulars, etc. The first turns counter 404 may be coupled to the power drive 402 and configured to measure turns of the first tubular 2 during makeup. The second turns counter 408 may be coupled to the power drive 402 and configured to measure turns of a clamp of the power drive 402 configured to engage the first tubular 2 during makeup.

The turns counters 404, 408 may include interfaces for communicating with another device. For example, the turns counters 404, 408 may include two-wire, 4-20 milliamp serial interfaces 406, 410 used for transmitting turns counter signals. The turns counters 404, 408 may be communicatively coupled with the remote processing system 420 via the interface. One example of the remote processing system 420 includes Joint Analysis and Makeup (JAM) devices, such as the JAMCompact™ torque monitoring system by Weatherford, Inc. The remote processing system 420 may also have an interface that supports serial communication on two channels.

The turns counters 404, 408 may send a 4-20 milliamp signal representing the measured turns over the interfaces 406, 410 to the remote processing system 420. For example, the 4-20 milliamp signal may be sent to the server 422. The turns data may be sent (e.g., permanently) during the makeup process to provide information regarding turns of the tubular 2 and turns of the clamp of the power drive 402. The server 422 may provide the turns data to the client 424. One example of the client 424 includes a JAM client, such as the TorkPro™ torque/turn analyzing software by Weatherford, Inc. The turns data may then be used to evaluate the connection, output a graphical display, make control decisions for power drive 402, etc.

The first turns sensor 412 may be coupled to the back-up tong 104 and configured to detect turns of the coupling 6 during makeup. The second turns sensor 416 may be coupled to the power drive 402 and configured to detect turns of the second tubular 4 during makeup.

The turns counters/sensors 404, 408, 412, and 416 can be used in various combinations during operations. In one embodiment, the first and second turns counter 404 and 408 are used in combination with one sensor that contacts the coupling 6, such as the turns sensor 412 or a turns counter. In another embodiment, the turns counters 404 and 408 are used with two turns sensors 412, 416 or turns counters as shown in FIG. 4. In another embodiment, the turns counters 404 and 408 are used with one turns sensor or turns counter that is in contact with the lower tubular 4. In another embodiment, only the turns counters 404 and 408 are used and the difference between the measurements of the turns counter 404 and 408 indicates a problem in the connection.

The turns sensors 412, 416 may include interfaces for communicating with another device. For example, the turns sensors 412, 416 may include two-wire, 4-20 milliamp serial interfaces 414, 418 used for transmitting turns sensor signals. The turns sensors 412, 416 may be communicatively coupled with the remote processing system 420 via the interface.

The turns sensors 412, 416 may send a 4-20 milliamp signal representing the detected turns over the interfaces 414, 418 to the remote processing system 420. For example, the 4-20 milliamp signal may be sent to the server 422. The detected turns data may be sent (e.g., permanently) during the makeup process to provide information regarding detected turns of the coupling 6 and/or the second tubular 4. The server 422 may provide the detected turns data to the client 424. The detected turns data may then be used to evaluate the connection, output a graphical display, make control decisions for power drive 402, etc.

During the makeup process, the turns counters and turns sensors may send turns data via the 4-20 milliamp interfaces. The client 424 may use the measured turns data and detected turns data to evaluate a connection. In some cases, the client 424 may perform an automated evaluation. In some cases, the client 424 may output a display (e.g., a graphical display) and an operator/technician can evaluate the connection. An input control from the operator/technician or an automated control decision from the client 424 can be sent from the processing system 420 to the power drive 402. In one example, the client 424 may compare the measured turns data and detected turns data with job defined set points and create an error message to prevent a wrong set up.

According to certain aspects, the measured turns data and/or detected turns data can be sent from server 422 to the client 424 in response to a request. For example, the client 424 may send a request to the server 422 for the measured turns data and/or detected turns data and server 424 can send the measured turns data and/or detected turns data information in response to the request.

In one aspect, the server 422 may be a stand-alone computer. The server 422 may include a storage unit (e.g., similar to storage device 221) for storing data for operations, such as data for each makeup or break out. Alternatively, the server 422 may be a storage unit in the remote processing system 420. The client 424 may be a terminal computer that may be remote from the server 422, or could be the same computer. The client 424 may be a mobile unit, such as a tablet, that allows operations at flexible locations.

Figure 5:
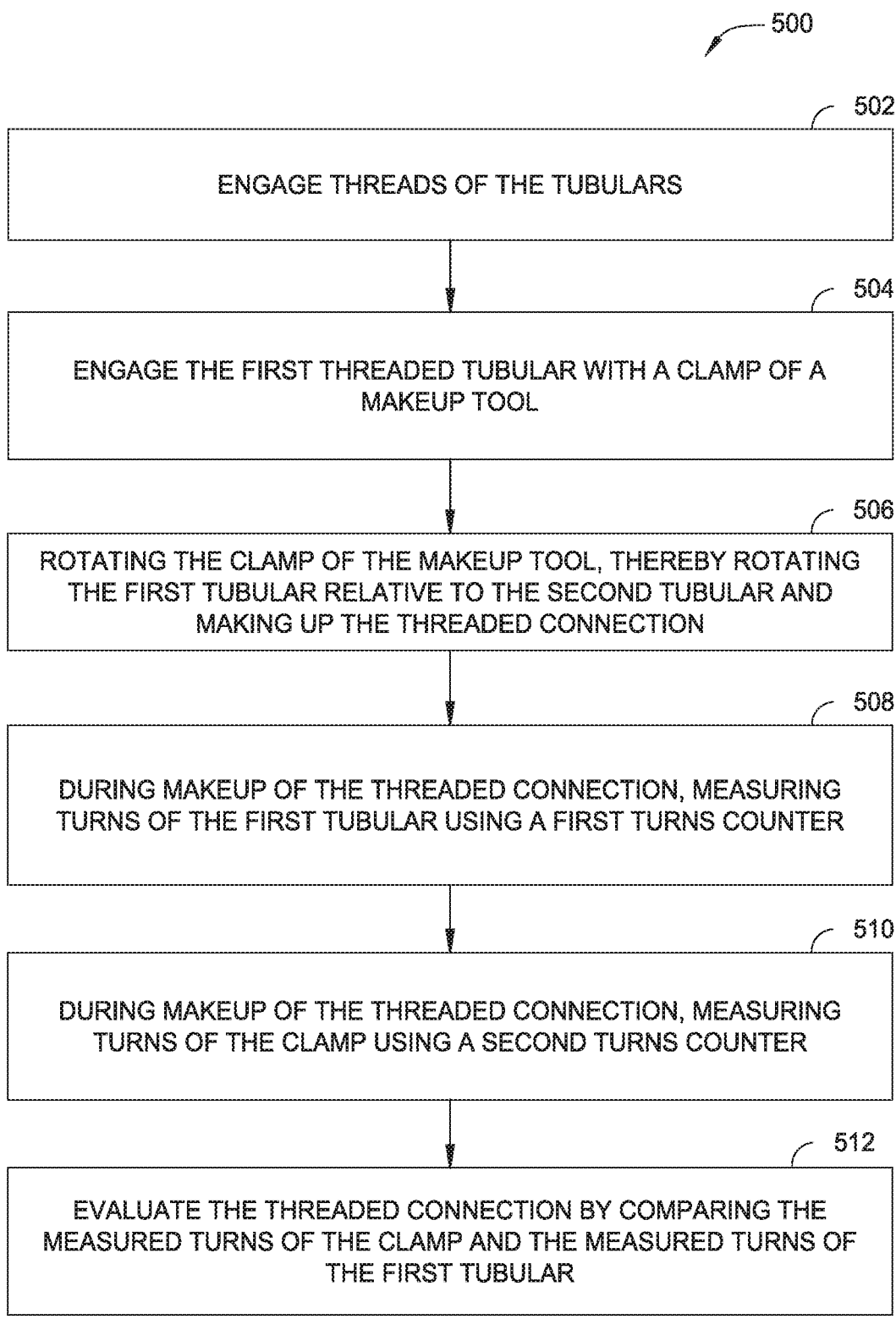
FIG. 5 is a flow diagram of example operations for evaluating a threaded connection, in accordance with certain aspects of the present disclosure.

FIG. 5 is a flow diagram illustrating example operations 500 for connecting a first threaded tubular to a second threaded tubular, in accordance with certain aspects of the present disclosure. The operations 500 may be performed by a tubular makeup system. At 502, the threads of the first threaded tubular may be engaged to threads of the second threaded tubular. At 504, the first threaded tubular may be engaged by a clamp of a makeup tool. At 506, the clamp is rotated, thereby rotating the first threaded tubular relative to the second threaded tubular and making up the threaded connection. At 508, during makeup of the threaded connection, turns data at the first tubular is measured using a first turns counter. At 510, during makeup of the threaded connection, turns data at the clamp of the makeup tool is measured using a second turns counter. At 512, the threaded connection is evaluated by comparing the measured turns data of the clamp and the measured turns data of the first tubular.

In some embodiments, operations 500 may further include during makeup of the threaded connection, the measured turns data at the first tubular is sent from the first turns counter (e.g., via the 4-20 milliamp interface) to the remote processing system. For example, the previous operations may precede block 512.

In some embodiments operations 500 may further include during makeup of the threaded connection, the measured turns data at the clamp of the makeup tool is sent from the second turns counter (e.g., via the 4-20 milliamp interface) to the remote processing system. For example, the previous operations may precede block 512.

In some embodiments, operations 500 may further include during makeup of the threaded connection, detecting turns of a tubular coupling using a first turns sensor. Sending, from the first turns sensor (e.g., via the 4-20 milliamp interface), the detected turns data to the remote processing system. Based on the detected turns of the tubular coupling, evaluating the threaded connection.

In some embodiments, operations 500 may further include engaging the second tubular with a second clamp of the makeup tool.

In some embodiments, operations 500 may further include during makeup of the threaded connection, detecting turns of the second tubular using a second turns sensor. Sending, from the second turns sensor (e.g., via the 4-20 milliamp interface), the detected turns data to the remote processing system. Based on the detected turns of the second tubular, evaluating the threaded connection.

In some embodiments, evaluating the threaded connection may further include determining whether a slippage event occurred between the clamp and the first tubular.

Figure 6:
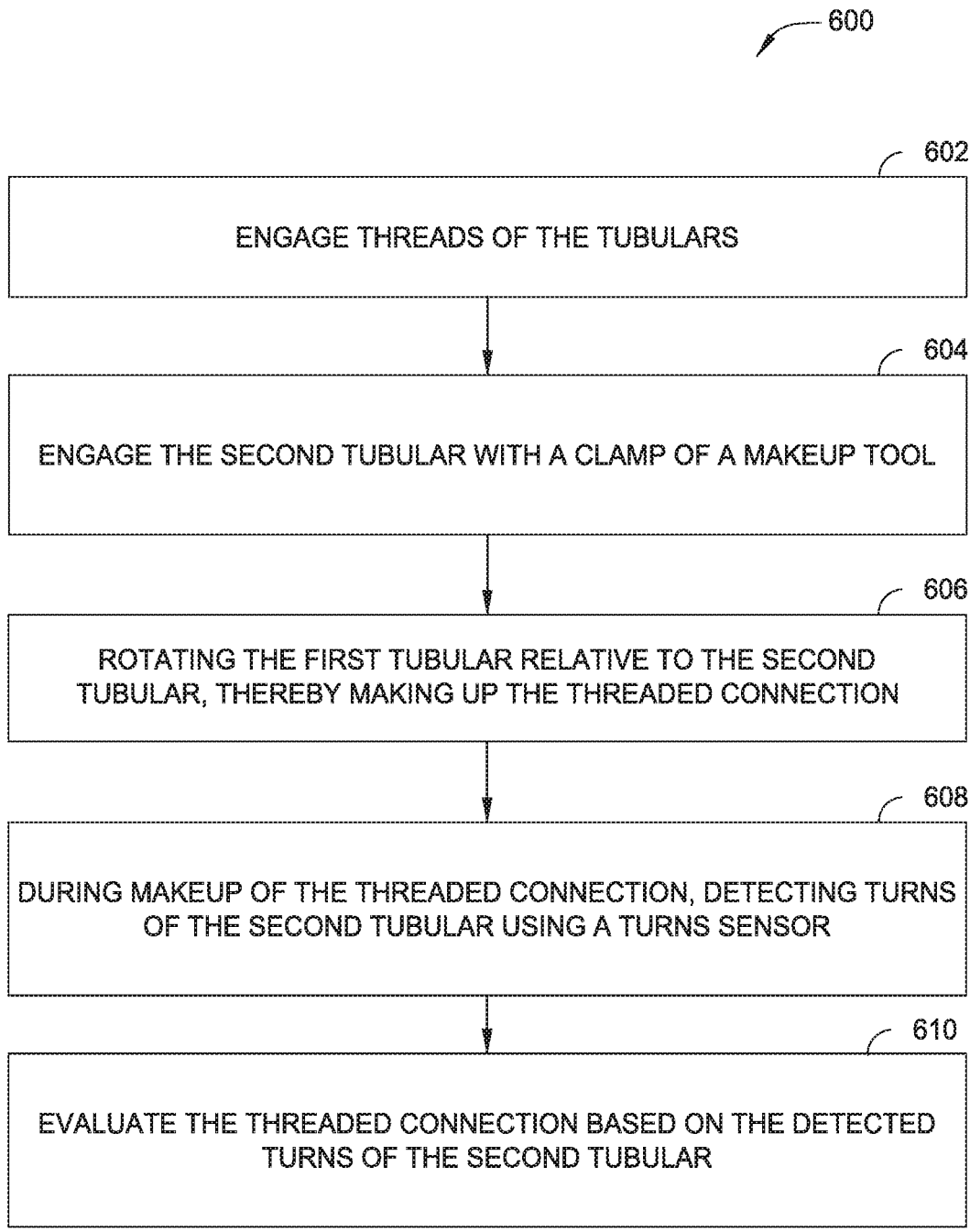
FIG. 6 is a flow diagram of example operations for evaluating a threaded connection, in accordance with certain aspects of the present disclosure.

FIG. 6 is a flow diagram illustrating example operations 600 for connecting a first threaded tubular to a second threaded tubular, in accordance with certain aspects of the present disclosure. The operations 600 may be performed by a tubular makeup system. At 602, the threads of the first threaded tubular may be engaged to threads of the second threaded tubular. At 604, the second threaded tubular may be engaged by a clamp of a makeup tool. At 606, the first threaded tubular is rotated relative to the second threaded tubular, thereby making up the threaded connection. At 608, during makeup of the threaded connection, turns data is detected at the second tubular using a turns sensor. At 610, the threaded connection is evaluated based on the detected turns data of the second tubular.

In some embodiments, operations 600 may further include during makeup of the threaded connection, sending, from the turns sensor, the detected turns data to the remote processing system. For example, the previous operations may precede block 610.

Figure 7:
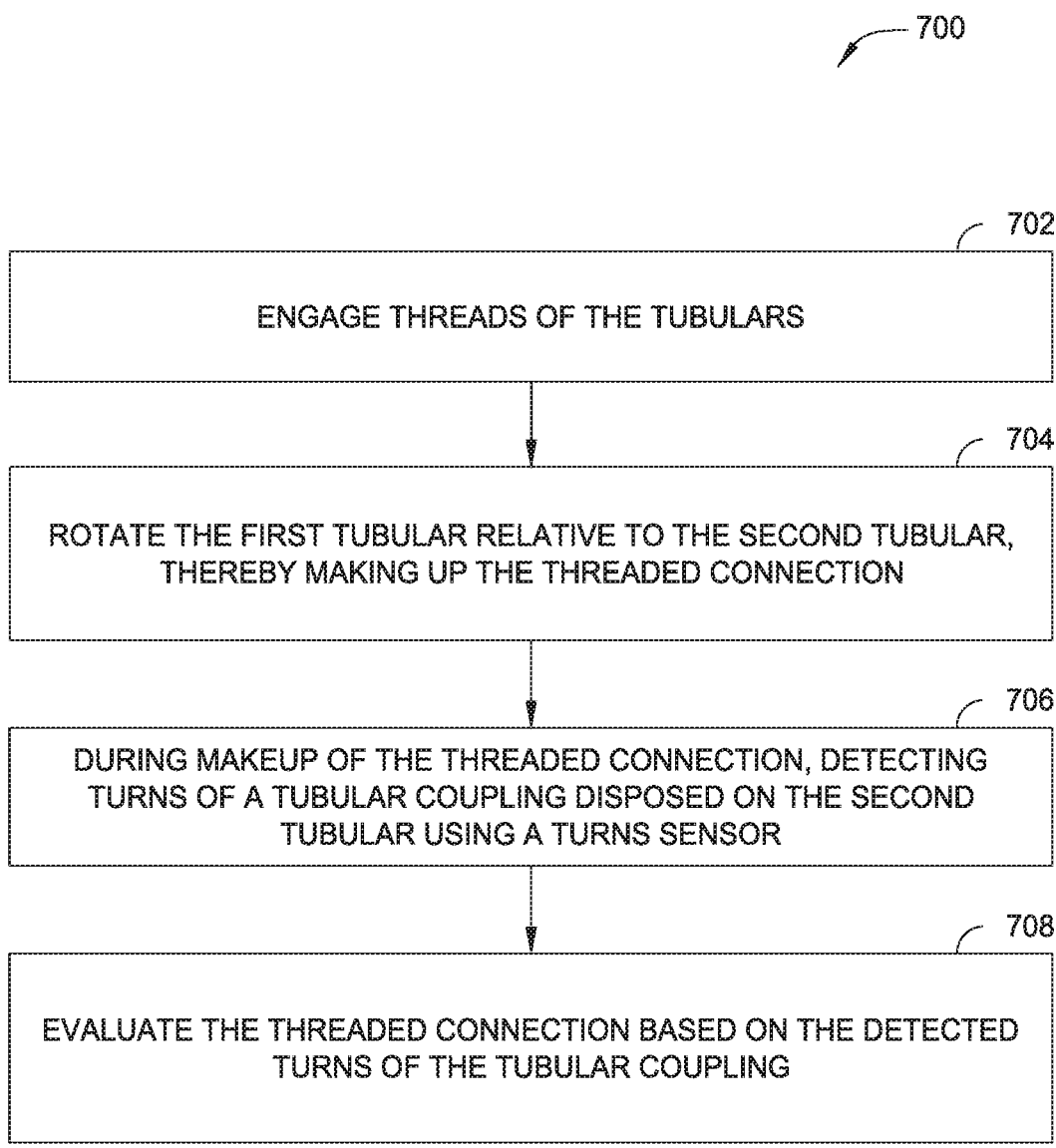
FIG. 7 is a flow diagram of example operations for evaluating a threaded connection, in accordance with certain aspects of the present disclosure.

FIG. 7 is a flow diagram illustrating example operations 700 for connecting a first threaded tubular to a second threaded tubular, in accordance with certain aspects of the present disclosure. The operations 700 may be performed by a tubular makeup system. At 702, the threads of the first threaded tubular may be engaged to threads of the second threaded tubular. At 704, the first threaded tubular is rotated relative to the second threaded tubular, thereby making up the threaded connection. At 706, during makeup of the threaded connection, turns data is detected at a tubular coupling disposed on the second tubular using a turns sensor. At 708, the threaded connection is evaluated based on the detected turns data of the tubular coupling.

In some embodiments, operations 700 may further include during makeup of the threaded connection, sending, from the turns sensor, the detected turns data to the remote processing system. For example, the previous operations may precede block 708.

Figure 8:
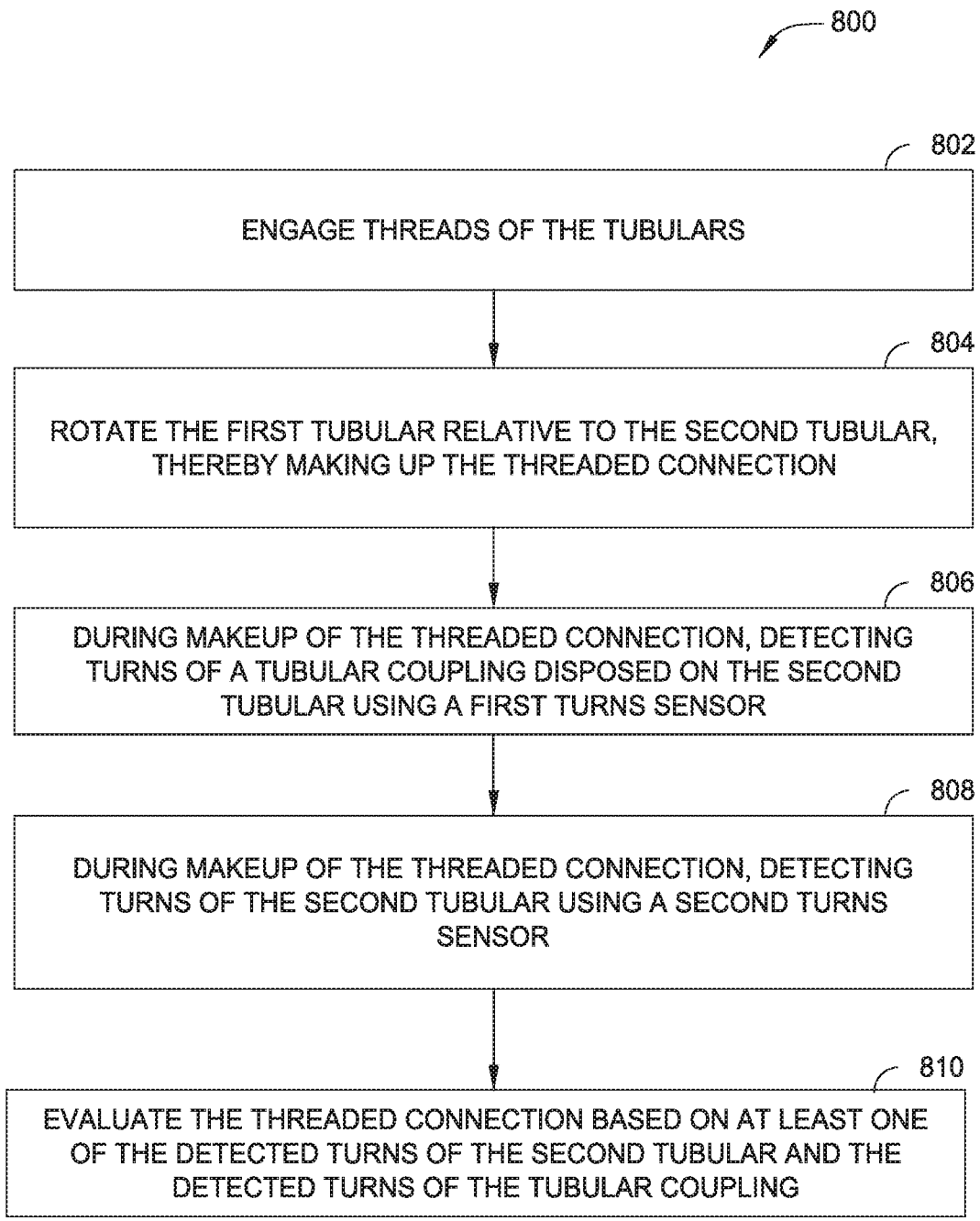
FIG. 8 is a flow diagram of example operations for evaluating a threaded connection, in accordance with certain aspects of the present disclosure.

FIG. 8 is a flow diagram illustrating example operations for connecting a first threaded tubular to a second threaded tubular, in accordance with certain aspects of the present disclosure. The operations 800 may be performed by a tubular makeup system. At 802, the threads of the first threaded tubular may be engaged to threads of the second threaded tubular. At 804, the first threaded tubular is rotated relative to the second threaded tubular, thereby making up the threaded connection. At 806, during makeup of the threaded connection, a first turns data is detected at a tubular coupling disposed on the second tubular using a first turns sensor. At 808, during makeup of the threaded connection, a second turns data is detected at the second tubular using a second turns sensor. At 810, the threaded connection is evaluated based on at least one of the detected turns of the tubular coupling and the detected turns of the second tubular.

In some embodiments, operations 800 may further include during makeup of the threaded connection, sending, from the first turns sensor, the detected turns data of the tubular coupling to the remote processing system. For example, the previous operations may precede block 810.

In some embodiments, operations 800 may further include during makeup of the threaded connection, sending, from the second turns sensor, the detected turns data of the second tubular to the remote processing system. For example, the previous operations may precede block 810.

Any of the operations described above, may be included as instructions in a non-transitory computer-readable medium for execution by the tong remote unit 204, control system 206, PLC 220, remote processing system 420, or any other processing system. The computer-readable medium may comprise any suitable memory for storing instruction, such as read-only memory (ROM), random access memory (RAM), flash memory, an electrically erasable programmable ROM (EEPROM), a compact disc ROM (CD-ROM), or a floppy disk.

Backup Tong Slippage and Coupling Rotation Detection

Embodiments of the present disclosure further include apparatus and methods for detecting backup tong slippage and coupling rotation during makeup or breakout of tubular joints using a power tong assembly.

When making up/breaking out tubulars using a tong assembly, such as the tong assembly 100 described above, the backup tong in the tong assembly usually clamps on to a first tubular joint while the power tong clamps to a second tubular to make up/break out a threaded connection between the first and second tubulars. When operating on a rig, the backup tong typically clamps on to the stationary stump of a tubular string that is sticking out of the rotary table on the rig floor while the power tong clamps on the tubular to be added to or removed from the tubular string.

One problem with operating the tong assembly is slipping of the backup tong. A torque reaction system in between the backup tong and the power tong transfers the reaction torque of the connection from the power tong into the backup tong. When the reaction torque overcomes the clamping force of the backup tong on the tubular string, the backup tong slips from the tubular string and the backup tong rotates relative to the tubular string. It is important to stop rotational movement when the backup tong starts to slip because slipping of the backup tong can lead to uncontrolled movement of the power tong which can damage equipment and creates a safety hazard.

Another problem during making up or breaking out is the possibility of the coupling rotation. As shown in the example in FIG. 1A, the coupling 4 is pre-made up to the tubular 2 in a pipe mill with a makeup torque. To connect the tubulars 2 and 6, the tubular 6 is coupled to the coupling 4 using a tong assembly at a field torque. The markup torque is slightly higher than to the field torque. During makeup or breakout, the power tong clamps above the coupling and the backup tong clamps below the coupling resulting in a torque applied across the coupling. The torque applied across the coupling may cause the coupling to rotate in some scenarios during the makeup or breakout. Rotation of coupling affects the rotation measurements in the tubulars which are later used for the evaluation of the connection.

In the past a proximity sensor on the back of the tong assembly has been used to limit the movement of the tong assembly. The proximity sensor is stationary mounted on a positioning device and reads a flag of a certain size on the tong. When the backup tong starts to slip, the proximity sensor will leave the flag and rotational movement of the tong assembly would be stopped.

Embodiments of the present disclosure include a tong assembly capable of detecting coupling rotation. In some embodiments, the tong assembly includes a rotation sensor attached to a backup tong in the tong assembly. The rotation sensor may be biased against the coupling during makeup or breakout to detect relative rotation between the coupling and the backup tong. In some embodiments, measurements of the relative rotation between the coupling and the backup tong are used to determine if the backup tong has slipped.

Figure 9:
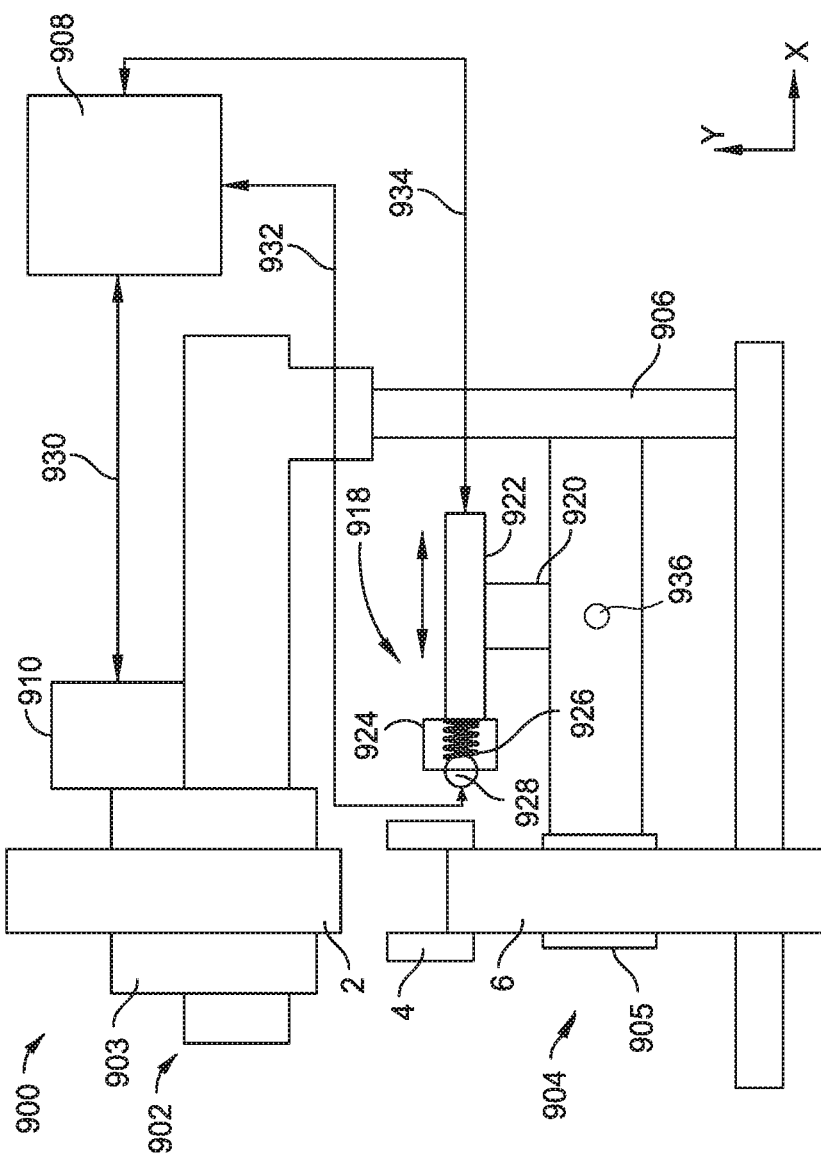
FIG. 9 is a schematic sectional view of a tong assembly according to one embodiment of the present disclosure.

FIG. 9 is a schematic sectional view of a tong assembly 900 according to one embodiment of the present disclosure. The tong assembly 900 may be similar to the tong assembly 100 described above. The tong assembly 900 may include a power tong 902 and a back-up tong 904. The power tong 902 and the backup tong 904 maybe connected by a frame 906. In one embodiment, the frame 906 may be alignment posts, similar to the guide columns 110 in the tong assembly 100, to align the backup tong 904 and the power tong 902. During operation, the tong assembly 900 may be moved to the tubular string for make-up or break-out. For example, the tong assembly 900 can be movably positioned above slips on a drilling rig to add a joint to or remove a joint from a tubular string secured in the slips.

The power tong 902 may include clamps 903 for holding a tubular, such as the tubular 6, therein. The power tong 902 may include one or more motors 910 configured to rotate a drive ring (not shown) to extend the clamps 903 and to rotate the tubular 6 during operation after the clamps 903 grip the tubular 6. In one embodiment, the power tong 902 includes an internal turns counter configured to measure rotation of the power tong 902 according to the rotation of the motor 910 and gear train (not shown). Alternatively, the power tong 902 may include on or more turns counters similar to the turns counter 208a in the tong assembly 100.

The backup tong 904 also includes clamps 905. During operation, the back-up tong 904 is configured to hold a tubular stationary using the clamps 905. In one embodiment, the backup tong 904 includes a rotation detection assembly 918. The rotation detection assembly 918 is configured to detect relative rotation between the backup tong 904 and a tubular clamped in the backup tong 904. In one embodiment, the rotation detection assembly 918 includes a base 920, a guide 922, and a sensor assembly 924. The base 920 is fixedly attached to the backup tong 904. The guide 922 is movably coupled to the base 920. The sensor assembly 924 is movably attached to the guide 922.

In one embodiment, the guide 922 is movable along a horizontal direction to move the sensor assembly 924 to and from a measuring position. The horizontal direction corresponds to the x-direction while the vertical direction corresponds to the y-direction in FIGS. 9 and 10A-10D. In one embodiment, an actuator is coupled between the base 920 and the guide 922 to move the guide 922 relative to the base 920. The actuator may be any suitable actuator, such as a hydraulic cylinder, an electric linear actuator, or the like.

In one embodiment, the sensor assembly 924 is movable along a vertical direction relative to the guide 922 so that the sensor assembly 924 can measure rotation of a tubular at various vertical locations. In one embodiment, an actuator is coupled between the sensor assembly 924 and the guide 922 to move the sensor assembly 924 relative to the guide 922. The actuator may be any suitable actuator, such as a hydraulic cylinder, an electric linear actuator, or the like.

In one embodiment, the sensor assembly 924 is movable along a vertical direction relative to the guide 924 so that the sensor assembly 924 can measure rotation of a tubular at various vertical locations. In one embodiment, an actuator is coupled between the sensor assembly 924 and the guide 922 to move the sensor assembly 924 relative to the guide 922. The actuator may be any suitable actuator, such as a hydraulic cylinder, an electric motor connected to linear gears, or the like.

The sensor assembly 924 may include a turns sensor 928 and a biasing element 926 configured to bias the turns sensor 928 against a tubular being measured. The turns sensor 928 may be any sensor capable of detecting rotation. In one embodiment, the turns sensor 928 is a turns wheel. Alternatively, the turns sensor 928 may be a contactless turns detector, such as an optical camera based sensor or a laser based sensor.

In one embodiment, the tong assembly 900 includes a backup movement sensor 936 configured to measure movement of the backup tong 904. The backup movement sensor 936 may be a g-force sensor or a gyro sensor that is mounted on the backup tong 904. Measurements of the backup movement sensor 936 may be used to monitor backup slippage.

The tong assembly 900 further includes a controller 908. The controller 908 may be connected to the motor 910 and configured to send commands through a control line 930 to rotate the power tong 902 at a target speed and/or direction. In one embodiment, the controller 908 may monitor an internal turns counter for recording the rotation of the power tong 902 during an operation. In another embodiment, the controller 908 may receive direct sensor-based measurements of rotation of the tubular clamped in the power tong 902 during an operation.

The controller 908 is connected to the rotation detection assembly 918 through a control line 934 to move the sensor assembly 924 relative to the backup tong 904. The controller 908 is connected to the turns sensor 928 through a control line 932 to receive measurement from the turns sensor 928.

Even though the control lines 930, 932, 934 are shown as wired connection in FIG. 9, one or all of the control liens 930, 930, 934 may be a wireless connection.

Figure 10A:
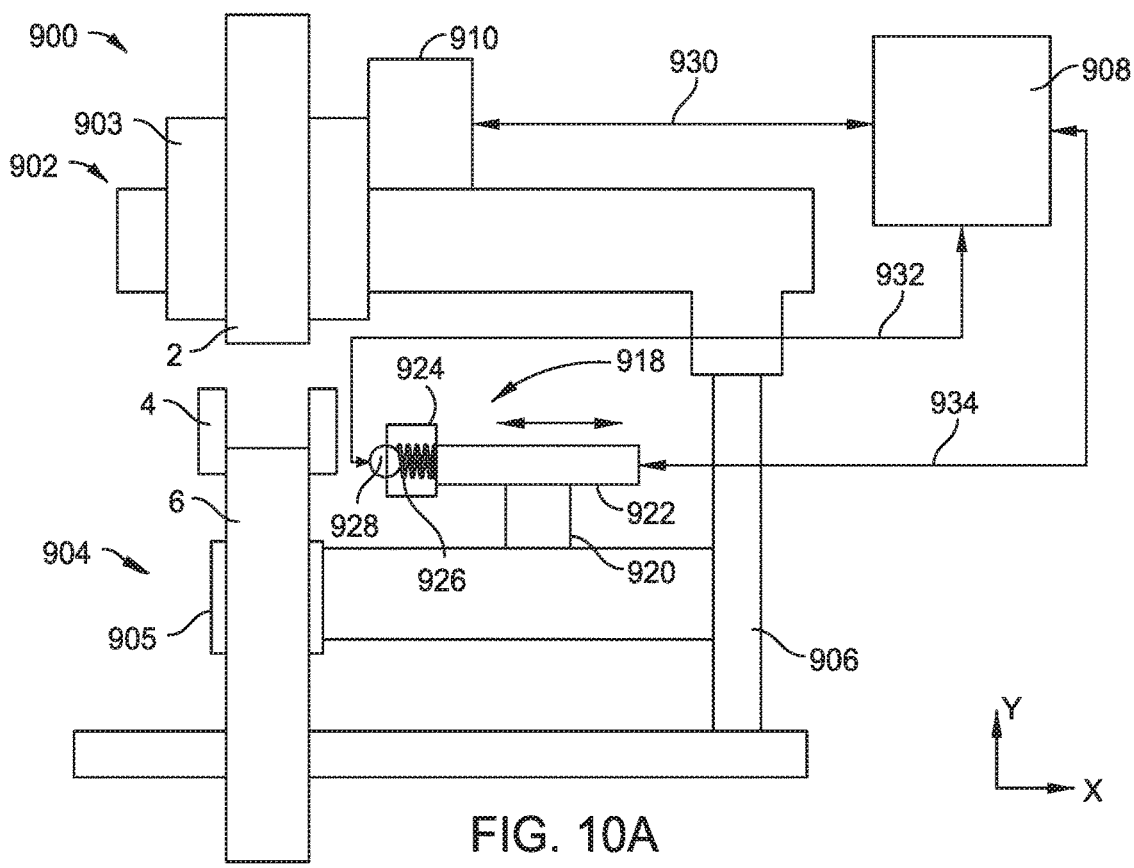
FIG. 10A-10D are schematic block views of the tong assembly of FIG. 9 during different positions of operation.

FIG. 10A-10D are schematic block views of the tong assembly 900 of FIG. 9 during different positions of operation. In FIG. 10A, the tong assembly 900 is in a non-operating position, in which the rotation detection assembly 918 is pulled back from the tubular 6 and the coupling 4 that is clamped in the backup tong 904. In FIG. 10A, the power tong 902 clamps on the tubular 2, the backup tong 904 clamps on the tubular 6 having the coupling 4 that is pre-made on the tubular 6, and the tubular 2 is not coupled to the coupling 4. In FIG. 10A, the power tong 902 may be ready to make up a connection between the coupling 4 and the tubular 2 or the power tong 902 may have just completing breaking-out a connection between the coupling 4 and the tubular 2.

Figure 10B:
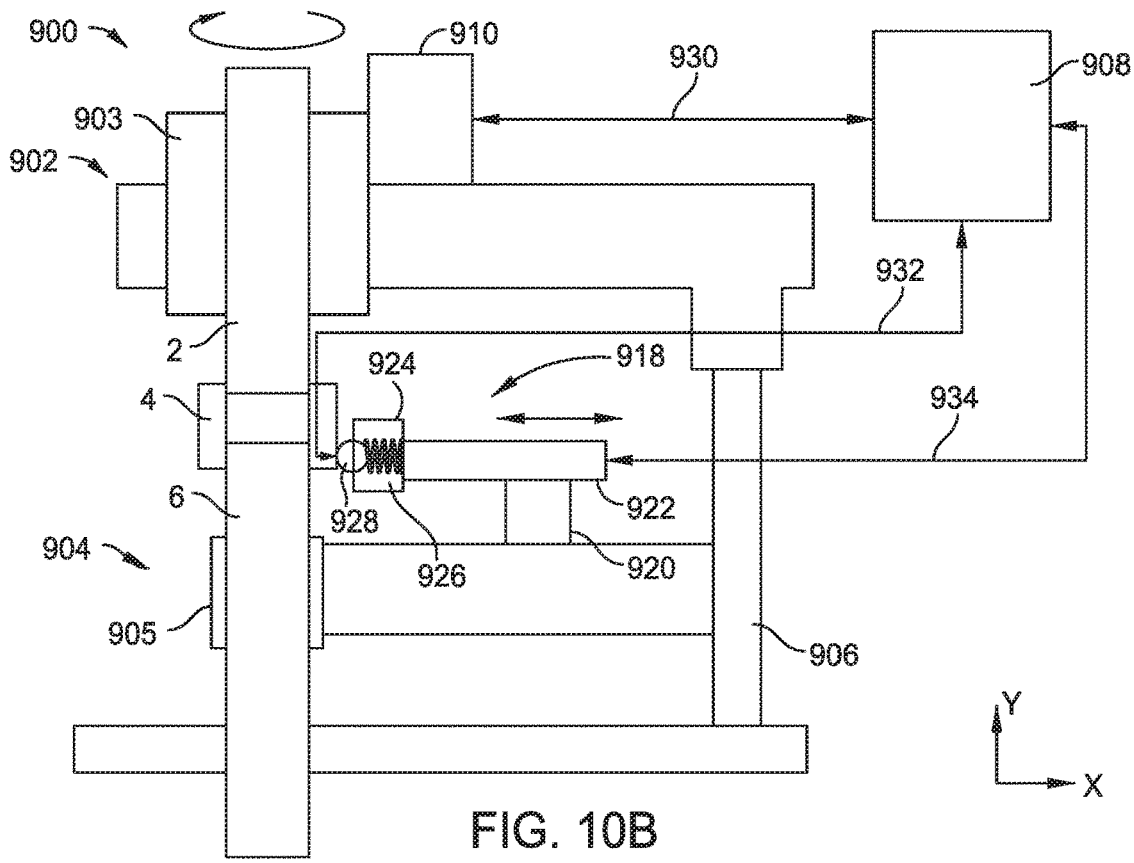

In FIG. 10B, the tong assembly 900 is in an operating position, in which the sensor assembly 924 is moved forward with the turns sensor 928 biased against the coupling 4 while the power tong 902 rotates to makeup or breakout a connection between the coupling 4 and the tubular 2. In some embodiments, the controller 908 monitors the measurement of the turns sensor 928 and stops the rotation of the power tong 902 upon a measurement of the turns sensor 928 indicating that the coupling 4 has rotated relative to the backup tong 904. The relative rotation between the coupling 4 and the backup tong 904 may be caused by coupling rotation or backup slippage. Embodiments of the present disclosure further include methods for detecting coupling rotation and/or backup slippage. The methods are further discussed in detail with regard to FIGS. 11 and 12.

To move from the non-operating position in FIG. 10A to the operating position in FIG. 10B, the guide 922 first moves horizontally relative to the base 920 towards the coupling 4 and tubular 6 to a horizontal position where a sufficient bias force is applied between the turns sensor 928 and the coupling 4 so that the turns sensor 928 is capable of measuring the rotation of the coupling 4 relative to the backup tong 904. In some embodiments, the sensor assembly 924 may move vertically prior to or after the horizontal movement to align the turns sensor 928 with the coupling 4. Similarly, after the operation of makeup or breakout, the guide 922 moves horizontally relative to the base 920 and returns the sensor assembly 924 to the non-operating position.

Figure 11:
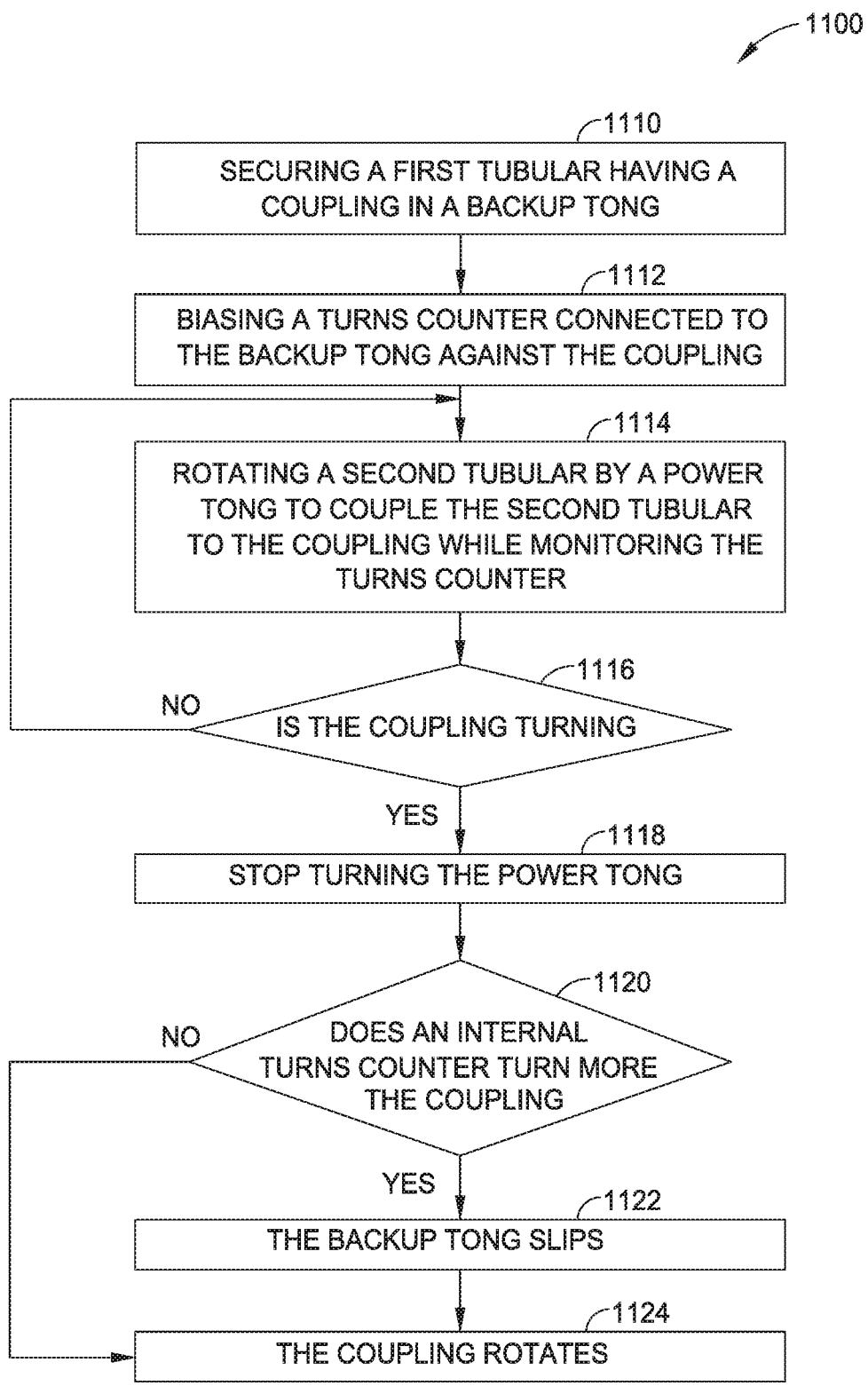
FIG. 11 is a flow diagram of an example operation for detecting coupling rotation or backup tong slippage during makeup according to one embodiment of the present disclosure.

FIG. 11 is a flow diagram of a method 1100 for detecting coupling rotation or backup tong slippage during makeup according to one embodiment of the present disclosure. The method 1100 can be performed using the tong assemblies capable of detecting and measuring rotation of a coupling pre-made on a tubular when connecting another tubular to the coupling. For example, the method 1100 can be performed using the tong assembly 900 or the tong assembly 100 described above.

In operation 1110, a first tubular to be joined with a second tubular is clamped by a backup tong in a tong assembly, such as the tong assembly 900. The first tubular includes a coupling that is pre-made on one end, such as the coupling 4 which is pre-made on one end of the tubular 6. The backup tong clamps on to the tubular 6 while the coupling 4 is not clamped.

In operation 1112, a turns sensor is positioned to detect and measure rotation of the coupling relative to the backup tong. In one embodiment, the turns sensor is a turns counter that is connected to the backup tong and remains stationary relative to the backup tong during measurement, such as the turns sensor 928 in the tong assembly 900. Alternatively, the turns sensor may be other type of sensors, such as a camera, a laser sensor, an optical sensor, or other contactless sensor.

In operation 1114, the second tubular is clamped and rotated by a power tong in the tong assembly, such as the power tong 902 in the tong assembly 900, to connect with the coupling on the first tubular. The turns sensor is monitored while the power tong rotates the second tubular.

In operation 1116, measurements of the turns sensor are analyzed to determine if the coupling has rotated relative to the backup tong. Operation 1116 may be performed by a controller, such as the controller 908 connected to the tong assembly 900.

If rotation of the coupling is detected, operation 1118 is performed to stop rotation of the power tong. In one embodiment, operation 1118 may be performed by sending a command from the controller to the motor on the power tong. During normal operation of making up the connection between the coupling and the second tubular, the coupling remains stationary relative to the backup tong as the backup tong is configured to hold the first tubular and the coupling stationary. Relative rotation between the coupling and the backup tong may indicate that the first tubular has slipped from the backup tong or the coupling has rotated relative to the first tubular. Slippage of the backup tong may cause the tubular string connected to the first tubular to rotate, which may damage the tubular string. And either coupling rotation or backup tong slippage may introduce errors in rotation and torque measurements used for evaluating the connection between the coupling and the second tubular. Stopping the makeup operation after detecting relative rotation between the coupling and the backup tong can prevent damage or avoid mistakes in connection evaluation.

In some embodiments, an operation 1120 is performed to determine the cause of the relative rotation between the coupling and the backup tong. The operation 1120 may be performed in a controller, such as the controller 908 connected to the power tong 900, or a system controller. Operation 1120 may be performed in-situ or after the connection operation. In one embodiment, measurements of an internal turns counter for the power tong may be used in conjunction with the measurements of the coupling. Data from the internal turns counter may be used to calculate turns made by the power tong during a time period that the coupling rotation is detected. Measurements by the turns sensor monitoring the coupling may be used to calculate turns made by the coupling during the same time period.

If the power tong made more turns than the coupling during the same time period, then the backup tong slippage has occurred and an operation 1122 for reacting to the backup tong slippage may be performed. For example, gripping pads on the backup tong may be examined or clamping pressure may be increased in operation 1122.

If the power tong and the coupling made an equal number of turns in the time period, the coupling has rotated relative to the first tubular, which may indicate that the connection between the second tubular and the coupling is under-torqued. An operation 1124 may be performed in response to the coupling rotation. For example, the operation 1124 may include making an under-torque diagnosis.

Figure 12:
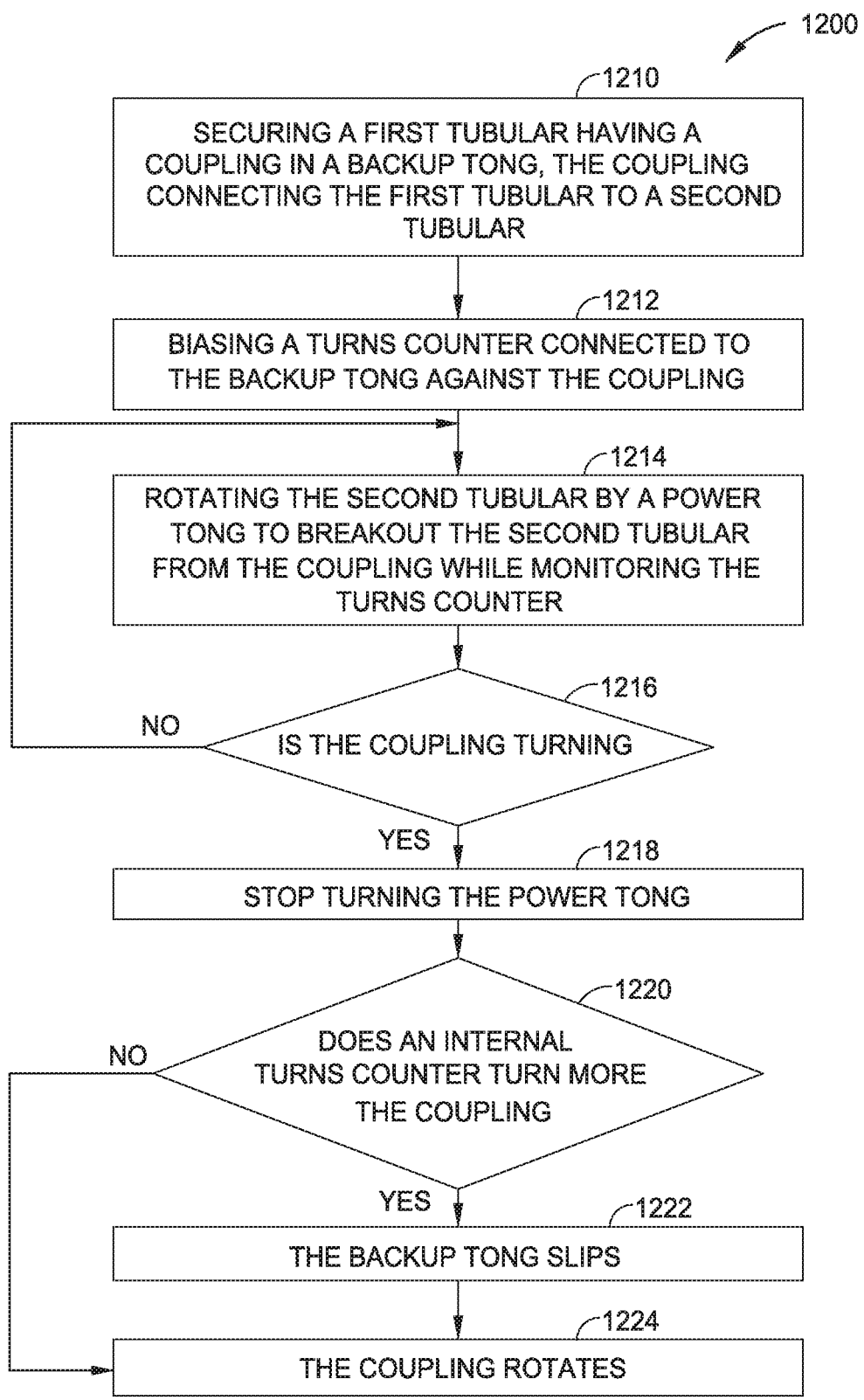
FIG. 12 is a flow diagram of an example operation for detecting coupling rotation or backup tong slippage during breakout according to one embodiment of the present disclosure.

FIG. 12 is a flow diagram of a method 1200 for detecting backup tong slippage during breakout according to one embodiment of the present disclosure. The method 1200 can be performed using the tong assemblies capable of detecting and measuring rotation of a coupling pre-made on a tubular when breaking out a connection between the coupling and another tubular. For example, the method 1200 can be performed using the tong assembly 900 or the tong assembly 100 described above.

In operation 1210, a first tubular, which has a pre-made coupling and is connected to a second tubular through the coupling, is clamped by a backup tong in a tong assembly, such as the tong assembly 900. The first tubular may be similar to the tubular 6 having the coupling 4 and the second tubular may be similar to the tubular 2 coupled to the coupling 4. The backup tong clamps on to the tubular 6 while the coupling 4 is not clamped.

In operation 1212, a turns sensor is positioned to detect and measure rotation of the coupling relative to the backup tong. In one embodiment, the turns sensor is a turns counter that is connected to the backup tong and remains stationary relative to the backup tong during measurement, such as the turns sensor 928 in the tong assembly 900. Alternatively, the turns sensor may be other type of sensors, such as a camera, a laser sensor, an optical sensor, or other contactless sensor.

In operation 1214, the second tubular is clamped and rotated by a power tong in the tong assembly, such as the power tong 902 in the tong assembly 900, to breakout the connection to the coupling on the first tubular. The turns sensor is monitored while the power tong rotates the second tubular.

In operation 1216, measurements of the turns sensor is analyzed to determine if the coupling has rotated relative to the backup tong. Operation 1216 may be performed by a controller, such as the controller 908 connected to the tong assembly 900.

If the rotation of the coupling is detected, operation 1218 may be performed to stop rotation of the power tong. In one embodiment, operation 1218 may be performed by sending a command from the controller to the motor on the power tong. During normal operation of breaking out the connection between the coupling and the second tubular, the coupling remains stationary relative to the backup tong as the backup tong is configured to hold the first tubular and the coupling stationary. Relative rotation of between the coupling and the backup tong may indicate that the first tubular has slipped from the backup tong or the coupling has rotated relative to the first tubular. Slippage of the backup tong may cause the tubular string connected to the first tubular to rotate, which may damage the tubular string. Coupling rotation may result the coupling is decoupled from the first tubular causing the first tubular and second tubular unsuitable for further service. Stopping the makeup operation after detecting relative rotation between the coupling and the backup tong can prevent damages.

In some embodiments, an operation 1220 is performed to determine the cause of the relative rotation between the coupling and the backup tong. The operation 1220 may be performed in a controller, such as the controller 908 connected to the power tong 900, or a system controller. The operation 1220 may be performed in-situ or after the operations. In one embodiment, measurements of an internal turns counter for the power tong may be used in conjunction with the measurements of the coupling. Data from the internal turns counter may be used to calculate turns made by the power tong during a time period that the coupling rotation is detected. Measurements by the turns sensor monitoring the coupling may be used to calculate turns made by the coupling during the same time period.

When the power tong made more turns than the coupling during the same time period, the backup tong slippage has occurred and an operation 1222 for reacting to the backup tong slippage may be performed. For example, gripping pads on the backup tong may be examined and/or clamping pressure may be increased in operation 1222.

When the power tong and the coupling made equal amount of turns, the coupling has rotated relative to the first tubular, which may indicate that the connection between the first tubular and the coupling has come loose. An operation 1224 may be performed in response to the coupling rotation. For example, the operation 1224 may include resume the breaking out operation and mark the first tubular and second tubular for repairs.

Tubular String Centering

Figure 10C:
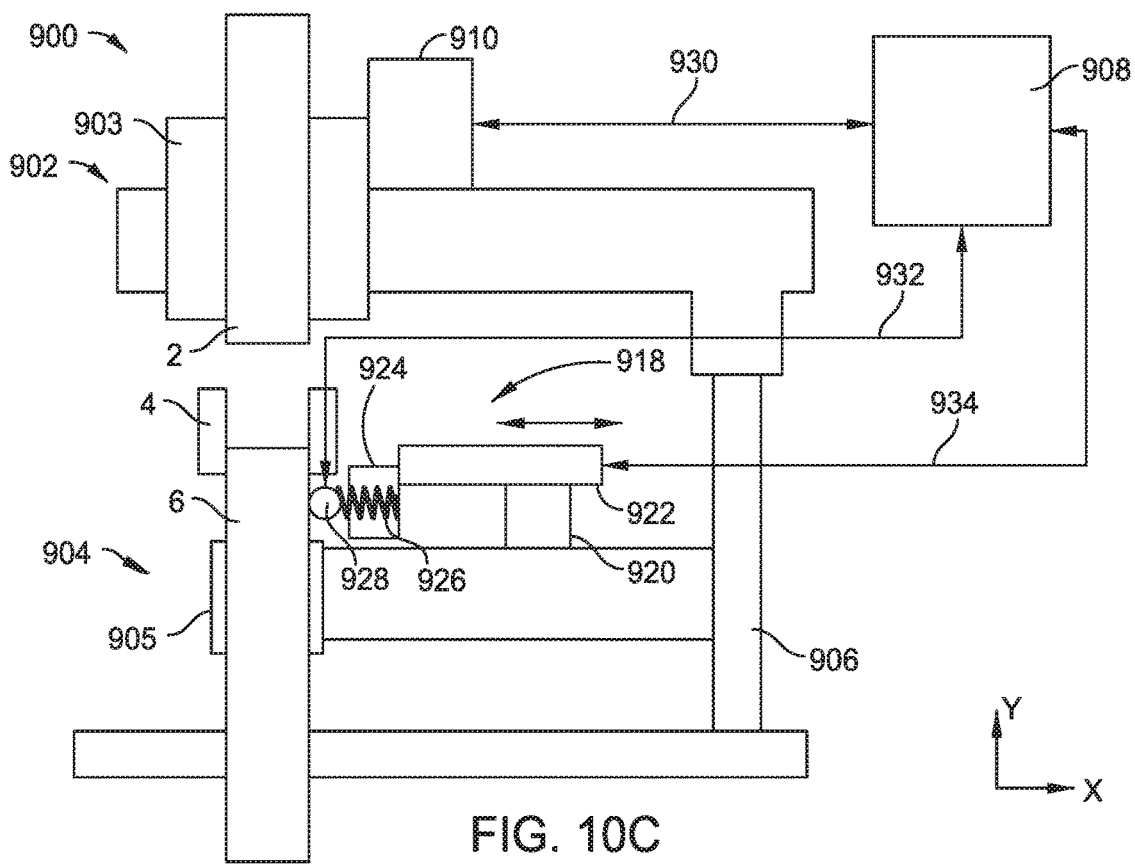
Figure 10D:
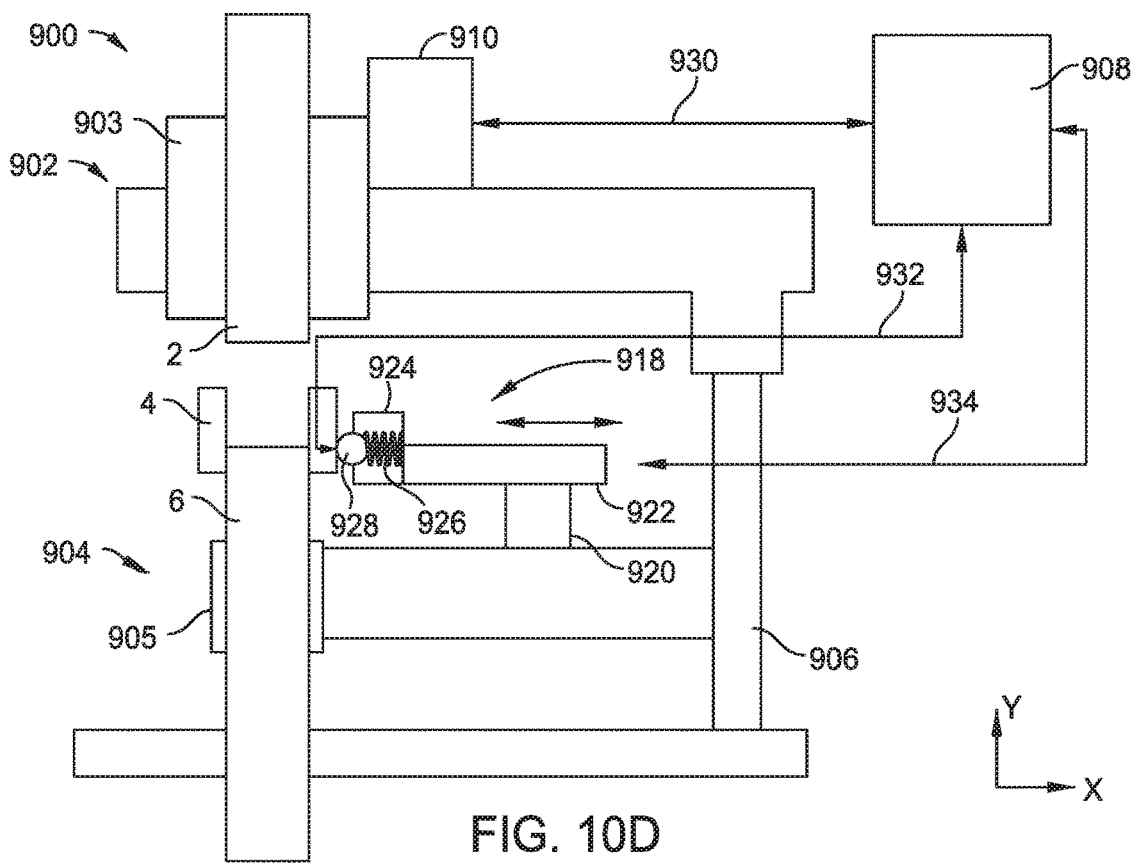

In one embodiment, the tong assembly 900 can be used to center a tubular string relative to the backup tong. FIGS. 10C and 10D schematically illustrate the tong assembly 900 during an operation of positioning a tubular relative to the backup tong 904. Prior to making up or breaking out a tubular connection on a tubular string, the tong assembly 900 is first moved to a location so a central axis of the tong assembly 900 aligns with a central axis of the tubular string. The tubular string is typically fixed in a location, for example, secured in a slip above a wellbore. The tong assembly 900, being a movable apparatus, is typically moved to adjacent to the tubular string to align with the tubular string. In some embodiments, the rotation detection assembly 918 is used to align or center a tubular string with the tong assembly 900.

In FIG. 10C, the tong assembly 900 is moved over to adjacent a tubular string including the tubular 6 having the coupling 4. The tubular 6 and the coupling 4 have different outer diameters. The diameters of the tubular 6 and the coupling 4 are known. After moving to the position, the backup tong 904 clamps to the tubular 6. The guide 922 then moves horizontally relative to the base 920 towards the coupling 4 and tubular 6 so that the turns sensor 928 is pushed against the coupling 4 or the tubular 6. In FIG. 10C, the turns sensor 928 is pushed against the tubular 6. Alternatively, the turns sensor 928 may be pushed against the coupling 4. At this position, a first measurement of a parameter reflecting a horizontal location of the turns sensor 928 is made. For example, a bias force exerted from the biasing element 926 is measured at the position shown in FIG. 10C.

After measuring the parameter reflecting the horizontal location of the turns sensor 928, the sensor assembly 924 is moved vertically to a portion of the tubular string with a different diameter with the guide 922 remaining stationary. For example, the turns sensor 928 is moved being pushed against the tubular 6, as shown in FIG. 10C to being pushed against the coupling 4, as shown in FIG. 10D. Because the coupling 4 and the tubular 6 have different diameters, the horizontal locations of the turns sensor 928 changes when the turns sensor 928 moves from the tubular 6 to the coupling 4. A second measurement of the parameter reflecting the horizontal location of the turns sensor 928 is made.

Comparison of the first and second measurements is made to determine if the tubular 6 is centered in the clamps of the backup tong 904. When the central axis of the backup tong 904 is aligned with the central axis of the tubular string, the difference between first and second measurements reflects the difference between the diameter of the tubular 6 and the diameter of the coupling 4. For example, when the tubular string and the backup tong 904 are in alignment, the two measurements of biasing forces is substantially equal to 0.5 times the difference in diameters times the spring coefficient of the biasing element, $$\Delta F = 0.5 \Delta D k$$

When the difference between the two measurements are greater than 0.5 times the difference in diameters times the spring coefficient of the biasing element, the tubular string and the backup tong 904 are not aligned. A method for centering the tubular string is further described in the method of FIG. 13.

Figure 13:
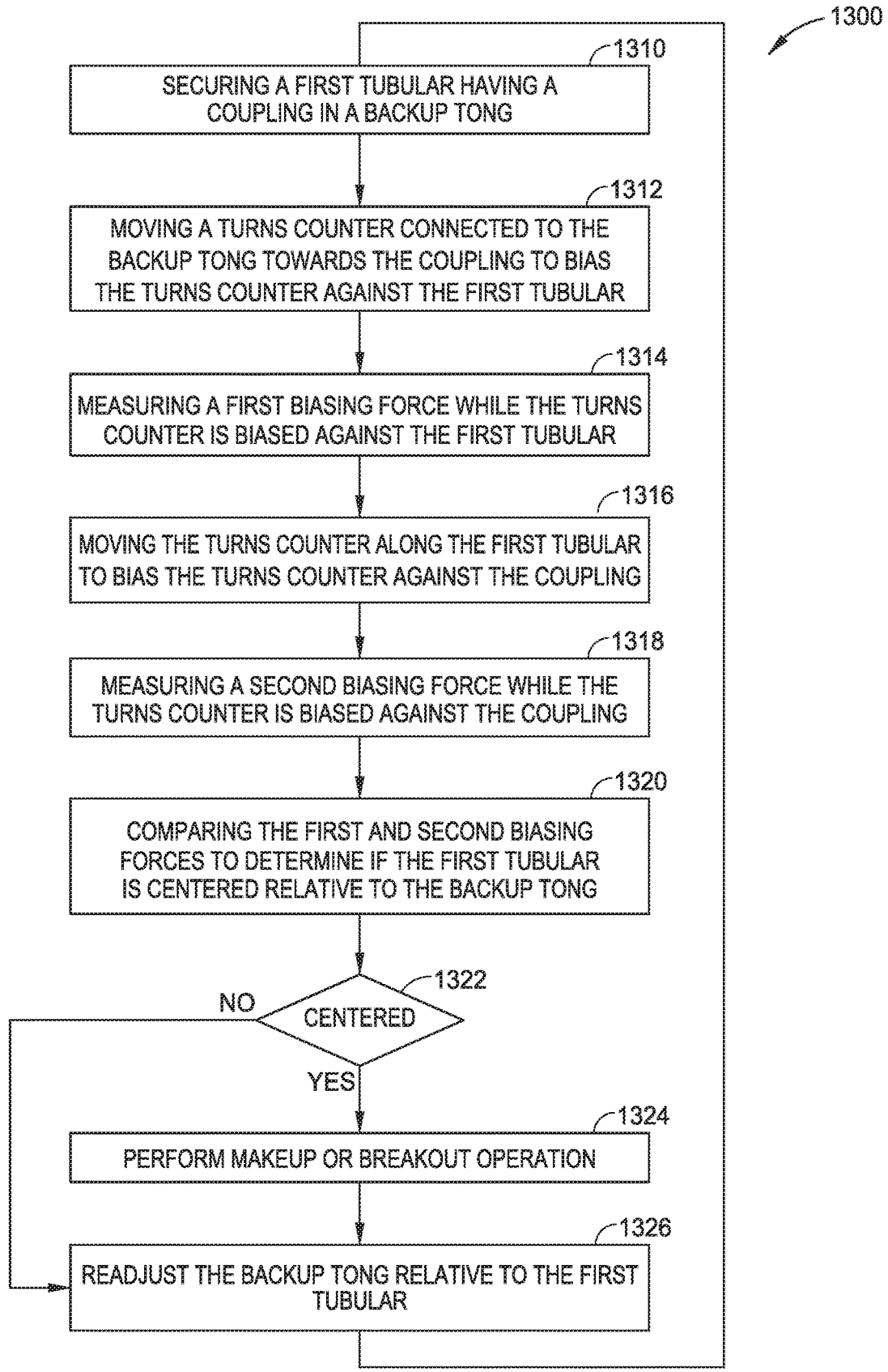
FIG. 13 is a flow diagram of an example operation for centering a tubular being handled according to one embodiment of the present disclosure.

FIG. 13 is a flow diagram of a method 1300 for aligning a tubular being handled according to one embodiment of the present disclosure. The method 1300 can be performed by tong assemblies having a vertically movable sensor for aligning with a tubular string having two or more different diameters. For example, the method 1300 can be performed by the tong assembly 900. The method 1300 can be performed with making up or breaking out operations. For example, the method 1300 can be performed prior to makeup or break out operations of a tong assembly, for example during operation 1110 in method 1100 and operation 1210 in method 1200.

In operation 1310, a tong assembly is moved towards a tubular string in an operating position to add a tubular to or remove a tubular from the tubular string. The tong assembly is moved by a carrier or along a track on the rig floor. The operating position may be determined by sensing the location of the tubular string with proximity sensors, optical sensors, or by observation from rig operators. Upon arriving at the operating position, the backup tong clamps to a first tubular on the tubular string. For example, the first tubular may be the top tubular of the tubular string during a makeup operation and the second tubular from the top in a breakout operation. The first tubular may include sections of with different diameters, for example the first tubular may include a coupling has a larger diameter than the remaining portion of the tubular, such as tubular 6 and the coupling 4.

In operation 1312, a component connected to the backup tong is moved towards the first tubular to be in contact with the first tubular. The component may be biased against the first tubular by a biasing element. For example, the component may be the turns sensor 928 in the tong assembly 900. Alternatively, the component may be any other component that is attached to the backup tong and movable vertically and horizontally.

In operation 1314, a first measurement of a parameter reflecting a horizontal location of the component against the first tubular is made. In one embodiment, when the tong assembly 900 is used, a first bias force exerted from the biasing element 926 is measured.

In operation 1316, the component is moved vertically to contact a portion of tubular having a different diameter. For example, the sensor assembly 924 is moved vertically to a portion of the tubular string with a different diameter with the guide 922 remaining stationary. The horizontal location of the turns sensor 928 changes because the turns sensor 918 is pushed against a tubular portion with different diameter. In one embodiment, the component is moved from the main tubular portion to the coupling pre-made on the tubular. Alternatively, the component is moved from the coupling to the main tubular portion.

In operation 1318, a second measurement of the parameter reflecting the horizontal location of the component is made. In one embodiment, when the tong assembly 900 is used, a second bias force exerted from the biasing element 926 is measured.

In operation 1320, the comparison of the first and second measurement is made. The comparison may be used to determine if the tubular string is aligned with the tong assembly.

In operation 1322, an analysis is made to determine if the tubular string and the tong assembly are aligned. In one embodiment, information of the tubular dimensions at the location of the first and second measurements is used. For example, the diameter of the main tubular portion and the diameter of the coupling are used for the alignment analysis. For the tong assembly 900, the difference between bias force exerted by the bias element 926 when the tubular string is aligned with the tong assembly can be calculated based on the dimensions of the tubular. When the variation between the measured difference (the difference between the first and second measurements) and the calculated difference is within a threshold value, the tubular string is considered aligned with the tong assembly. On the other hand, when the variation between the measured difference and the calculated difference is greater than the threshold value, the tubular string is considered misaligned with the tong assembly.

If the tong assembly and the tubular string are aligned, a making up or breaking out operation is performed in operation 1324.

If the tong assembly and the tubular assembly are misaligned, an operation 1326 is performed to readjust the location of the power tong. The tubular string is released from the clamp of the backup tong and the tong assembly is moved relative to the tubular string for realignment. Operations 1310 to 1322 may be performed repeatedly until readjustment is achieved.

In one or more of the embodiments described herein, a tubular makeup system includes: a makeup tool operable to rotate a first threaded tubular relative to a second threaded tubular, the makeup tool comprising: a clamp configured to: engage the first tubular; and rotate relative to the second tubular. The tubular makeup system includes: a first turns counter configured to measure turns of the first tubular; a second turns counter configured to measure turns of the clamp; and a programmable logic controller (PLC) operably connected to the makeup tool and communicatively coupled to the first turns counter and the second turns counter. The PLC is configured to control an operation, including: engaging threads of the tubular; engaging the first tubular with the clamp; rotating the clamp, thereby rotating the first tubular relative to the second tubular and making up a threaded connection; during makeup of the threaded connection: measuring turns of the first tubular; and measuring turns of the clamp; and evaluating the threaded connections by comparing the measured turns of the first tubular and the measured turns of the clamp.

In one or more of the embodiments described herein, the tubular makeup system includes a first turns sensor configured to detect turns of a tubular coupling disposed on the second tubular.

In one or more of the embodiments described herein, the tubular makeup system includes a second turns sensor configured to detect turns of the second tubular.

In one or more of the embodiments described herein, wherein the operation further includes: during makeup of the threaded connection: detecting turns of the tubular coupling; and detecting turns of the second tubular; and evaluating the threaded connection based on at least one of the detected turns of the tubular coupling and the detected turns of the second tubular.

In one or more of the embodiments described herein, the tubular makeup system further including a turns sensor configured to detect turns of the second tubular and the operation further including: during makeup of the threaded connection, detecting turns of the second tubular; and evaluating the threaded connection based on the detected turns of the second tubular.

In one or more of the embodiments described herein, wherein: the first turns counter is mounted to the makeup tool; and the second turns counter is mounted to the makeup tool.

In one or more of the embodiments described herein, wherein: the first turns sensor is mounted to the makeup tool; and the second turns sensor is mounted to the makeup tool.

In one or more of the embodiments described herein, wherein the makeup tool is a tong assembly.

In one or more of the embodiments described herein, wherein the operation further comprises engaging the second tubular with a second clamp of the makeup tool.

In one or more of the embodiments described herein, a tubular makeup system includes: a makeup tool operable to rotate a first tubular relative to a second tubular, the makeup tool comprising a clamp configured to engage the first tubular; a first turns counter configured to measure turns of the first tubular; and a second turns counter configured to measure turns of the clamp.

In one or more of the embodiments described herein, the tubular makeup system includes: a first turns sensor configured to detect turns of a tubular coupling disposed on the second tubular; and a second turns sensor configured to detect turns of the second tubular.

In one or more of the embodiments described herein, wherein the first turns counter is a contactless turns counter.

In one or more of the embodiments described herein, the tubular makeup system includes a remote processing system in communication with the first turns counter and the second turns counter, wherein the remote processing system is configured to evaluate a threaded connection between the first tubular and the second tubular.

In one or more of the embodiments described herein, the makeup tool further includes a second clamp configured to engage the second tubular.

In one or more of the embodiments described herein, a method of connecting a first threaded tubular to a second threaded tubular includes: engaging threads of the tubulars; engaging the first tubular with a clamp of a makeup tool; rotating the clamp of the makeup tool, thereby rotating the first tubular relative to the second tubular and making up the threaded connection; measuring turns of the first tubular; measuring turns of the clamp; and evaluating the threaded connection by comparing the measured turns of the first tubular and the measured turns of the clamp.

In one or more of the embodiments described herein, the method further includes: detecting turns of the second tubular; and evaluating the threaded connection based on the detected turns of the second tubular.

In one or more of the embodiments described herein, the method further includes: detecting turns of a tubular coupling disposed on the second tubular; and evaluating the threaded connection based on the detected turns of the tubular coupling.

In one or more of the embodiments described herein, the method further includes rejecting the threaded connection based on the evaluation.

In one or more of the embodiments described herein, the method further includes: detecting turns of the first tubular; detecting turns of a tubular coupling disposed on the second tubular; and evaluating the threaded connection based on at least one of the detected turns of the second tubular and the detected turns of the tubular coupling.

In one or more of the embodiments described herein, wherein the makeup tool is a tong assembly.

In one or more of the embodiments described herein, the method further including engaging the second tubular with a second clamp of a makeup tool.

One or more embodiments of the present disclosure provide a tong assembly comprising a power tong, a backup tong and a rotation detection assembly attached to the backup tong. The rotation detection assembly comprises a guide movably attached to the backup tong, and a turns sensor disposed on the guide, wherein the guide is movable relative to the backup tong to move the turns sensor between an operating position and a non-operating position.

In one or more embodiments, the rotation detection assembly further comprises a bias element positioned between the turns sensor and the guide.

In one or more embodiments, the bias element is a spring.

In one or more embodiments, the rotation detection assembly further comprises a first actuator disposed between the guide and the backup tong to move the guide along a horizontal direction relative to the backup tong.

In one or more embodiments, the rotation detection assembly further comprises a second actuator disposed between the turns sensor and the guide to move the turns sensor along a vertical direction relative to the guide.

In one or more embodiments, the tong assembly further comprises a controller, wherein the controller is connected to the turns sensor and the power tong.

One or more embodiments of the present disclosure provide a method for operating a tong assembly. The method comprises clamping a first tubular using a backup tong in the tong assembly, wherein a coupling is pre-made on the first tubular, clamping a second tubular using a power tong in the tong assembly, and rotating the power tong to makeup or break out a connection between the coupling and the second tubular while monitoring a relative rotation between the coupling and the backup tong.

In one or more embodiments, the method further comprises stopping the power tong upon detection of a relative rotation between the coupling and the backup tong.

In one or more embodiments, monitoring the relative rotation between the coupling and the backup tong comprises detecting rotation of the coupling using a turns sensor attached to the backup tong.

In one or more embodiments, the method further comprises moving the turns sensor along a horizontal direction relative to the backup tong to push the turns sensor against the coupling.

In one or more embodiments, the method further comprises moving the turns sensor along a vertical direction along the second tubular.

In one or more embodiments, the method further comprises upon detection of rotation of the coupling, determining if the first tubular has slipped from the backup tong according to measurements from the turns sensor and an internal turns counter in the power tong.

In one or more embodiments, the method further comprises performing an operation in response to slippage between the backup tong and the first tubular when the measurement of the internal turns counter is greater than the measurement of the turns sensor.

In one or more embodiments, the method further comprises moving the turns sensor vertically between the coupling and the first tubular to determine whether the backup tong and the first tubular are aligned.

In one or more embodiments, the method further comprises measuring a first bias force exerted from a bias element while the bias element pushes the turns sensor against the first tubular, measuring a second bias force exerted from the bias element while the bias element pushes the turns sensor against the coupling, and determining if the difference between the first bias force and the second bias force is within a range.

One or more embodiments of the present disclosure provide a tong assembly comprising a backup tong configured to clamp a first tubular in a stationary position, a turns sensor attached to the backup tong to measure a relative rotation between the backup tong and the first tubular, a power tong configured to clamp and rotate a second tubular relative to makeup or break out a connection between the first and second tubulars, and a controller connected to the power tong and the turns sensor, wherein the controller includes instructions, when executed by a computer, performing operations comprising monitoring the turns sensor to detect slippage of the backup tong, and stopping the power tong upon detection of slippage of the backup tong.

In one or more embodiments, the tong assembly further comprises a horizontal actuator coupled between the backup tong and the turns sensor to move the turns sensor along a horizontal direction, and a vertical actuator coupled between the backup tong and the turns sensor to move the turns sensor along a vertical direction.

In one or more embodiments, the tong assembly further comprises a bias element coupled between the turns sensor and the backup tong to push the turns sensor against the first tubular.

In one or more embodiments, the operations further comprises biasing the turns sensor against a coupling pre-made on the first tubular, and detecting slippage of the backup tong according to measurements of the turns sensor and an internal turns counter of the power tong.

In one or more embodiments, the operations further comprises moving the turns sensor along the first tubular between portions of different diameters, measuring bias forces exerted to the turns sensor at portions of the different diameters, and determining alignment between the first tubular and the backup tong based on the measured bias forces.

While the foregoing is directed to embodiments of the present invention, other and further embodiments of the invention may be devised without departing from the basic scope thereof, and the scope thereof is determined by the claims that follow.

The invention claimed is:

1. A tong assembly, comprising:
   a power tong;
   a backup tong; and
   a rotation detection assembly attached to the backup tong, wherein the rotation detection assembly comprises:
   a guide movably attached to the backup tong;
   a turns sensor disposed on the guide, wherein the guide is movable relative to the backup tong to move the turns sensor between an operating position and a non-operating position; and
   a first actuator disposed between the guide and the backup tong to move the guide along a horizontal direction relative to the backup tong.

2. The tong assembly of claim 1, wherein the rotation detection assembly further comprises:
   a bias element positioned between the turns sensor and the guide.

3. The tong assembly of claim 2, wherein the bias element is a spring.

4. The tong assembly of claim 1, wherein the rotation detection assembly further comprises:
   a second actuator disposed between the turns sensor and the guide to move the turns sensor along a vertical direction relative to the guide.

5. The tong assembly of claim 1, further comprising a controller, wherein the controller is connected to the turns sensor and the power tong.

6. A method for operating a tong assembly, comprising:
   clamping a first tubular using a backup tong in the tong assembly, wherein a coupling is pre-made on the first tubular;
   clamping a second tubular using a power tong in the tong assembly;
   rotating the power tong to makeup or break out a connection between the coupling and the second tubular while monitoring a relative rotation between the coupling and the backup tong by detecting rotation of the coupling using a turns sensor attached to the backup tong; and
   upon detection of rotation of the coupling, determining if the first tubular has slipped from the backup tong according to measurements from the turns sensor and an internal turns counter in the power tong.

27

7. The method of claim 6, further comprising:
stopping the power tong upon detection of a relative rotation between the coupling and the backup tong.

8. The method of claim 6, further comprising:
moving the turns sensor along a horizontal direction relative to the backup tong to push the turns sensor against the coupling.

9. The method of claim 8, further comprising:
moving the turns sensor along a vertical direction along the second tubular.

10. The method of claim 6, further comprising:
performing an operation in response to slippage between the backup tong and the first tubular when the measurement of the internal turns counter is greater than the measurement of the turns sensor.

11. The method of claim 6, further comprising:
moving the turns sensor vertically between the coupling and the first tubular to determine whether the backup tong and the first tubular are aligned.

12. The method of claim 11, further comprising:
measuring a first bias force exerted from a bias element while the bias element pushes the turns sensor against the first tubular;
measuring a second bias force exerted from the bias element while the bias element pushes the turns sensor against the coupling; and
determining if the difference between the first bias force and the second bias force is within a range.

13. A tong assembly, comprising:
a backup tong configured to clamp a first tubular in a stationary position;
a turns sensor attached to the backup tong to measure a relative rotation between the backup tong and the first tubular;
a horizontal actuator coupled between the backup tong and the turns sensor to move the turns sensor along a horizontal direction;
a vertical actuator coupled between the backup tong and the turns sensor to move the turns sensor along a vertical direction;
a power tong configured to clamp and rotate a second tubular relative to the first tubular to makeup or break out a connection between the first and second tubulars; and
a controller connected to the power tong and the turns sensor, wherein the controller includes instructions, when executed by a computer, for performing operations comprising:
monitoring the turns sensor to detect slippage of the backup tong with respect to a coupling pre-made on the first tubular; and

28 stopping the power tong upon detection of slippage of the backup tong.

14. The tong assembly of claim 13, further comprising:
a bias element coupled between the turns sensor and the backup tong to push the turns sensor against the first tubular.

15. The tong assembly of claim 13, wherein the operations further comprise:
biasing the turns sensor against the coupling pre-made on the first tubular; and
detecting slippage of the backup tong according to measurements of the turns sensor and an internal turns counter of the power tong.

16. The tong assembly of claim 15, wherein the operations further comprise:
moving the turns sensor along the first tubular between portions of different diameters;
measuring bias forces exerted to the turns sensor at portions of the different diameters; and
determining alignment between the first tubular and the backup tong based on the measured bias forces.

17. A method for operating a tong assembly, comprising:
clamping a first tubular using a backup tong in the tong assembly, wherein a coupling is pre-made on the first tubular;
clamping a second tubular using a power tong in the tong assembly;
rotating the power tong to makeup or break out a connection between the coupling and the second tubular while monitoring a relative rotation between the coupling and the backup tong; and
moving a turns sensor vertically between the coupling and the first tubular to determine whether the backup tong and the first tubular are aligned.

18. The method of claim 17, further comprising:
measuring a first bias force exerted from a bias element while the bias element pushes the turns sensor against the first tubular;
measuring a second bias force exerted from the bias element while the bias element pushes the turns sensor against the coupling; and
determining if the difference between the first bias force and the second bias force is within a range.

19. The method of claim 17, further comprising:
stopping the power tong upon detection of a relative rotation between the coupling and the backup tong.

20. The method of claim 17, wherein monitoring a relative rotation between the coupling and the backup tong comprises:
detecting rotation of the coupling using the turns sensor.

* * * * *